US008770254B1

(12) United States Patent
Hanneken et al.

(10) Patent No.: US 8,770,254 B1
(45) Date of Patent: Jul. 8, 2014

(54) TIRE CHANGER WITH ROTATIONAL POSITION AND TRACKING CONTROL

(75) Inventors: Douglas S. Hanneken, St. Louis, MO (US); Micah N. Vaninger, St. Louis, MO (US); Steven K. Molbach, Ballwin, MO (US); Joel Clasquin, Highland, IL (US)

(73) Assignee: Hunter Engineering Company, St. Louis, MO (US)

( * ) Notice: Subject to any disclaimer, the term of this patent is extended or adjusted under 35 U.S.C. 154(b) by 399 days.

(21) Appl. No.: 12/912,448

(22) Filed: Oct. 26, 2010

Related U.S. Application Data

(63) Continuation-in-part of application No. 12/504,217, filed on Jul. 16, 2009, now Pat. No. 8,613,303.

(60) Provisional application No. 61/255,316, filed on Oct. 27, 2009, provisional application No. 61/081,454, filed on Jul. 17, 2008.

(51) Int. Cl.
*B60C 25/138* (2006.01)
(52) U.S. Cl.
USPC .......................................... 157/1.17; 157/1.24
(58) Field of Classification Search
USPC ................... 157/1, 1.17, 1.24, 1.26, 1.28
See application file for complete search history.

(56) References Cited

U.S. PATENT DOCUMENTS

| 6,527,032 | B2 | 3/2003 | Corghi |
| 6,877,544 | B2 | 4/2005 | Kane et al. |
| 6,904,796 | B2 | 6/2005 | Pascai et al. |
| 7,089,987 | B2 | 8/2006 | Gonzaga |
| 7,188,656 | B2 * | 3/2007 | Gonzaga ...................... 157/1.17 |
| 7,296,351 | B2 * | 11/2007 | Gonzaga ...................... 157/1.17 |
| 7,404,427 | B2 | 7/2008 | Hillman et al. |
| 7,699,087 | B2 | 4/2010 | Rogalla et al. |
| 8,342,223 | B2 * | 1/2013 | Sotgiu .......................... 157/1.28 |
| 2006/0169414 | A1 * | 8/2006 | Hillman et al. ................... 157/1 |
| 2011/0100558 | A1 | 5/2011 | Corghi |
| 2012/0199293 | A1 | 8/2012 | Corghi |
| 2012/0205054 | A1 | 8/2012 | Kirstatter |

FOREIGN PATENT DOCUMENTS

| DE | 4202803 | C1 | 1/1992 |
| EP | 1479538 | A2 | 11/2001 |
| EP | 2319715 | A1 | 5/2011 |
| EP | 2487054 | A1 | 8/2012 |
| IT | 1263799 | B | 8/1996 |
| IT | M1951050 | A1 | 11/1996 |
| WO | 9942309 | | 8/1999 |

* cited by examiner

*Primary Examiner* — Hadi Shakeri
(74) *Attorney, Agent, or Firm* — Armstrong Teasdale LLP

(57) ABSTRACT

A tire changer machine includes a control system that monitors a rotational position of a sensitive feature associated with a wheel rim and tire during a tire change procedure. The system adjusts operation of the machine to avoid damaging the sensitive feature, which may be a valve stem or a wheel sensor such as a tire pressure monitoring system (TPMS) sensor.

46 Claims, 14 Drawing Sheets

TIRE CHANGER WITH ROTATIONAL POSITION AND TRACKING CONTROL

CROSS REFERENCE TO RELATED APPLICATIONS

This application claims the benefit of U.S. Provisional Application Ser. No. 61/255,316 filed Oct. 27, 2009, the disclosure of which is hereby incorporated by reference in its entirety.

This application is further a continuation-in-part application of U.S. application Ser. No. 12/504,217 filed Jul. 16, 2009 now U.S. Pat. No. 8,613,303 and entitled "Tire Changer with Force Detection and Control Methods", which claims the benefit of U.S. Provisional Application Ser. No. 61/081,454 filed Jul. 17, 2008, the entire disclosures of which are hereby incorporated by reference in their entirety.

This application also relates at least in part to subject matter disclosed in U.S. Pat. No. 6,822,582 entitled "Radio Frequency Identification Automotive Service Station", U.S. Pat. No. 7,404,427 entitled "Vehicle Tire Changer with Integrated Detector for Tire Pressure Sensors", and U.S. patent application Ser. No. 12/781,059 filed May 17, 2010 and entitled "Method and Apparatus for Selection of Vehicle-Specific Service Procedures", the disclosures of which are hereby incorporated by reference in their entirety.

BACKGROUND OF THE INVENTION

The field of the invention relates generally to machines for changing a tire on a wheel rim, and more specifically to tire changing machines having force detection, position detection and control capability.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that rotates the wheel rim about an axis. A bead breaker tool exerts pressure on the tire adjacent the wheel rim to break the tire bead seal, and a tire removal tool, which may be either manually inserted by a machine operator or integrated into the machine itself, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE INVENTION

Exemplary embodiments of tire changer machines and methods for performing tire change procedures are disclosed that account for the presence of features associated with the wheel rim and tire that are especially prone to damage during execution of a tire change procedure. Exemplary features of this type include, but are not necessarily limited to, valve stems, wheel sensors such as tire pressure monitoring system (TPMS) sensors, wheel spokes (especially raised spokes extending at an elevation greater than the tire sidewall), and automatic tire inflation mechanisms and the like. Such features, if contacted by the tools or portions of tires influenced by the tools, are much more vulnerable to be damaged than other portions or areas of the wheel rims and tires where such features are not present. As such, these features are sometimes considered "sensitive" presenting an increased risk of being damaged by otherwise normal operation of the machine.

The machines and methods include accepting inputs concerning an initial rotational position of certain features that are or may be sensitive, and thereafter monitoring the rotational position of those features and making appropriate adjustments as the machine is operated to determine and avoid positional conflicts between the machine tools and those features, or positional conflicts presented by a portion of the tire as it is moved and influenced by the machine tools, as the tools engage the tire or wheel rim as the machine operates to mount or demount tires. The wheel rim and tire may be properly positioned relative to the machine tools and certain features may be monitored and tracked in order to prevent those features, which may be sensitive ones, from becoming damaged during the mounting and demounting operations as the wheel rim and tire is rotated. Implemented in control features of the machine, such position tracking and control may be utilized in combination with force signals and other types of position tracking and monitoring to provide substantially automatic and error free operation of the machine.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Exemplary embodiments of tire changing machines and methods are described in detail below. The tire changing machines and methods facilitate efficient tire changing with reduced difficulty for machine operators and with improved control features. Information may be provided to machine operators concerning successful operation of the machine. Corrective action and instructions may be provided to avoid inadvertent damage to the wheel rim, damage to the machine itself, TPMS sensors mounted in the wheel, other features of interest on the wheel rim or tire, and/or potentially hazardous operating conditions during tire changing processes.

Figure 1A:
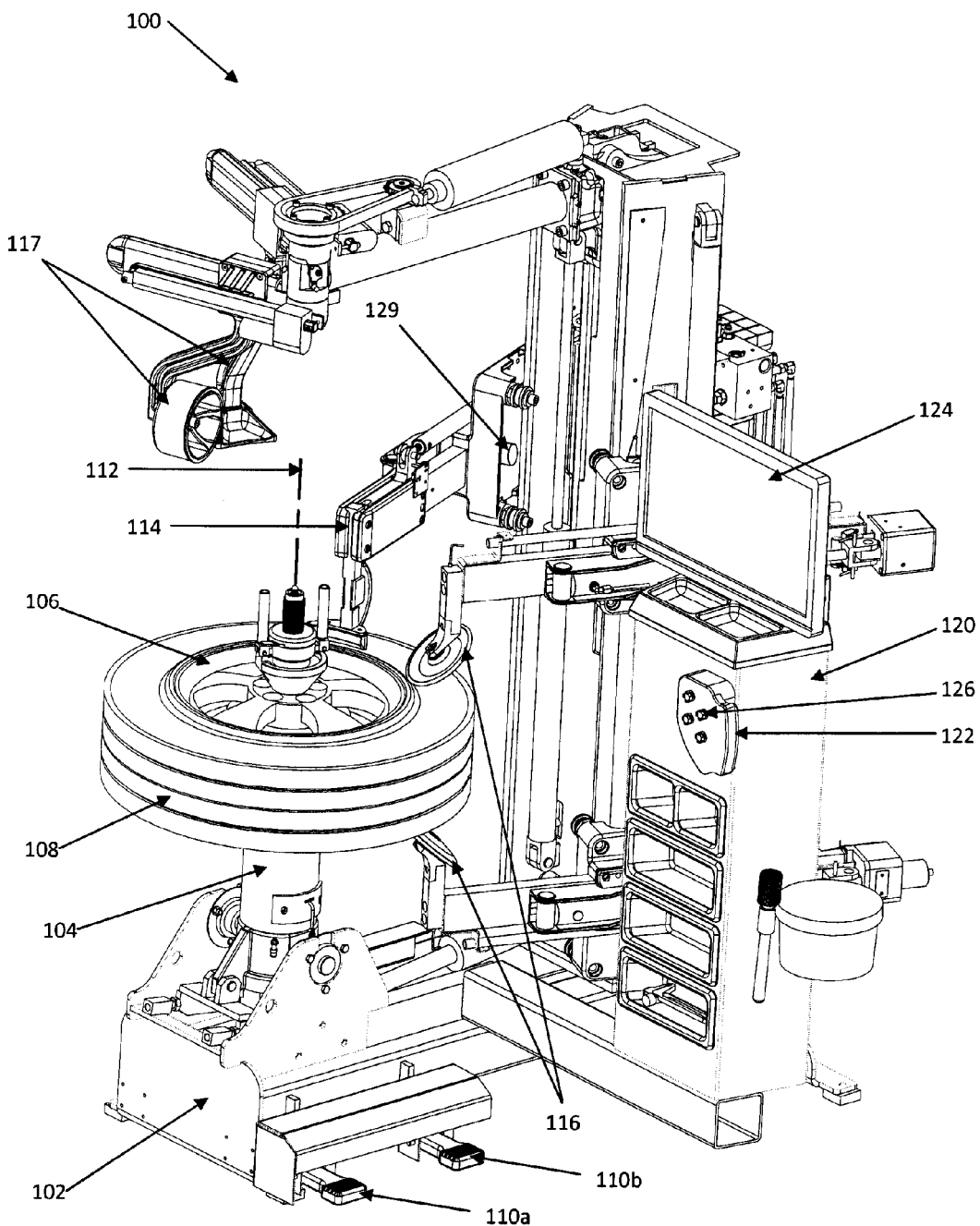
FIGS. 1a, 1b and 1c are respective views of an exemplary embodiment of a tire changing machine in a perspective view, a magnified view, and a sectional view.
Figure 1B:
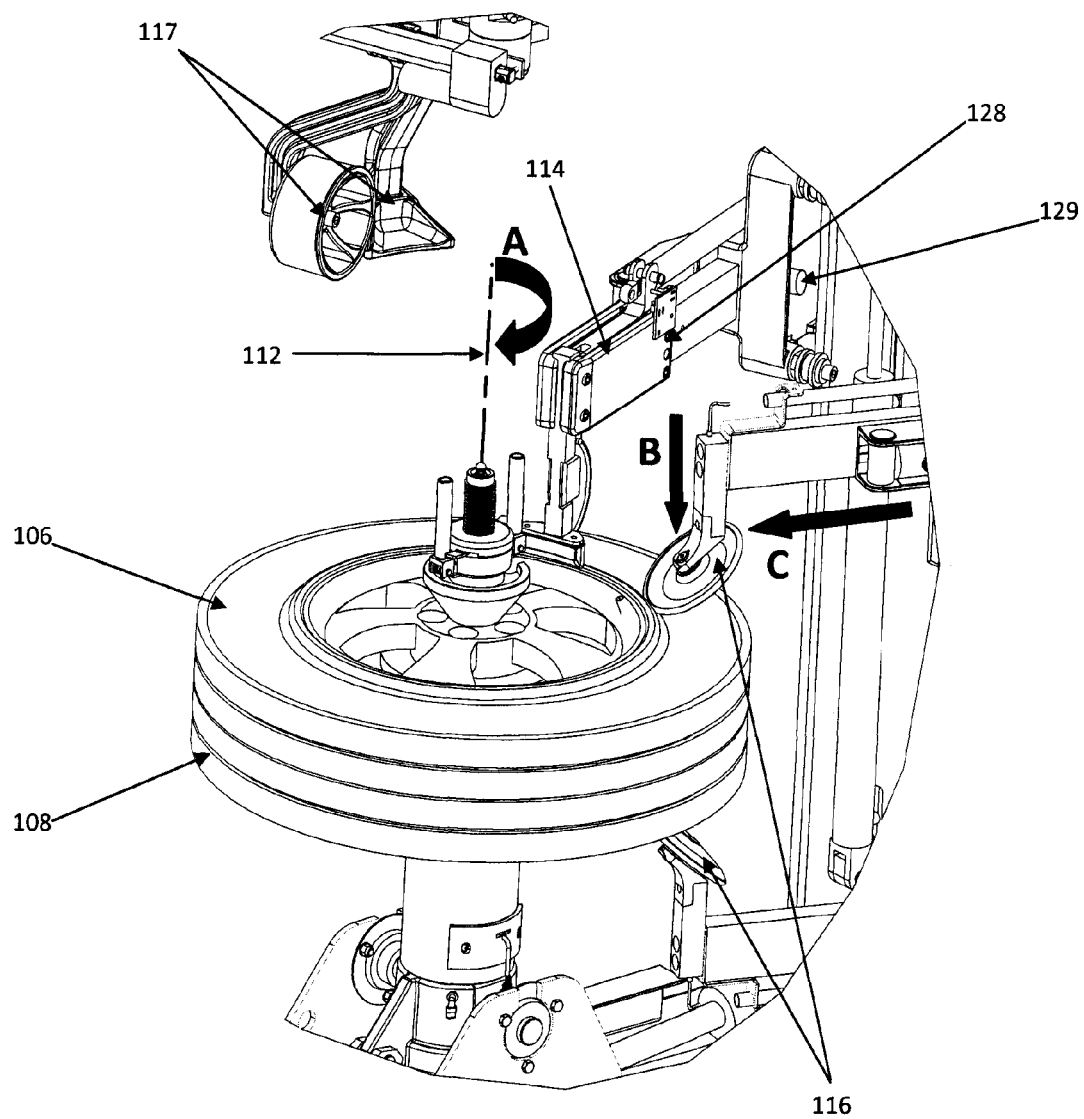
Figure 1C:
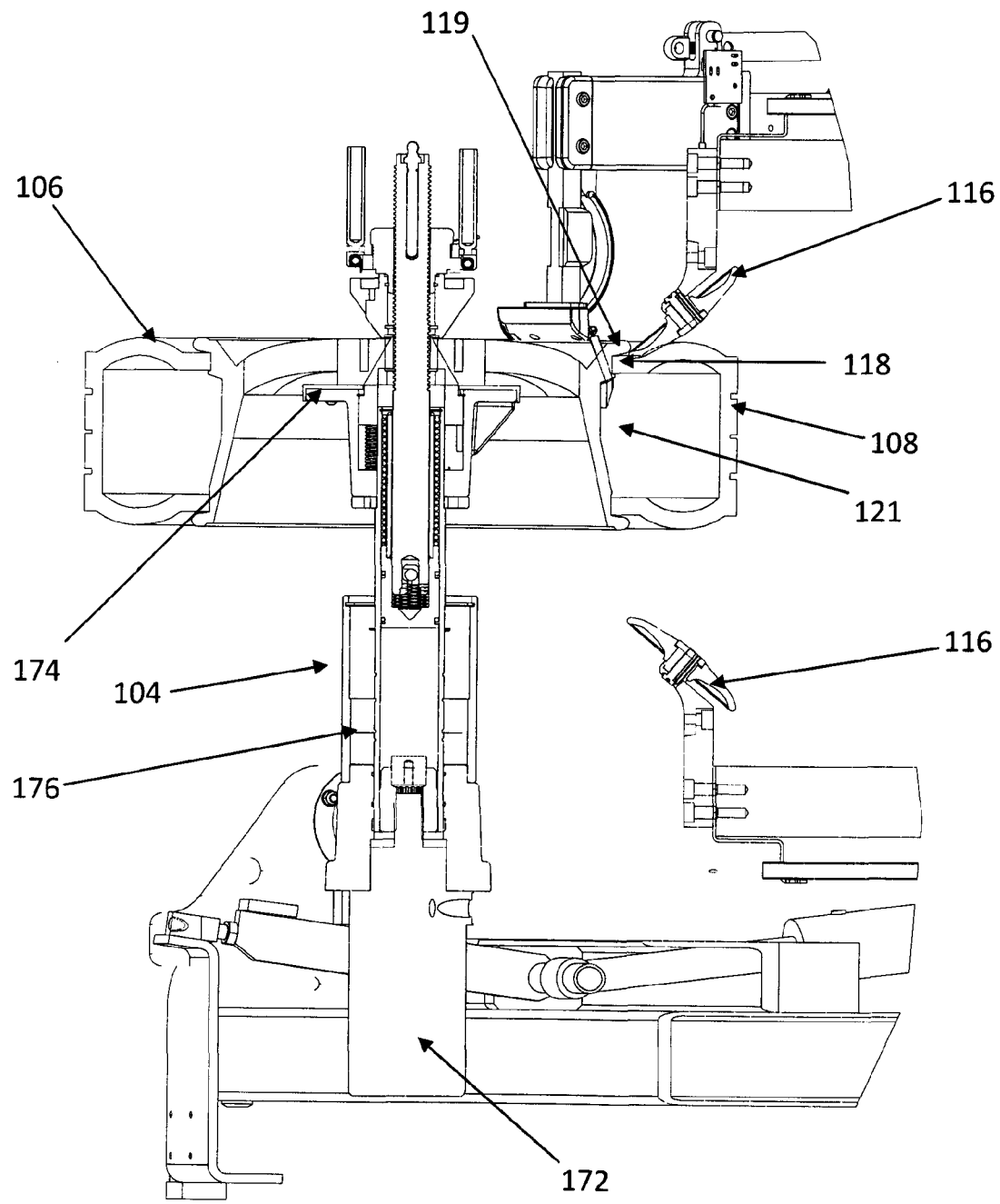

FIGS. 1a, 1b and 1c illustrate an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108. The wheel rim 106 may be secured to the drive shaft assembly 104 with a known clamping mechanism after the wheel rim 106 and tire 108 is loaded and mounted onto the machine 100. After the wheel rim 106 is clamped in position, a machine operator manipulates an input selector 110a which operates the drive shaft assembly 104 to rotate the wheel rim 106 and tire 108 about a drive axis 112 in the direction of arrow A (FIG. 1b). In different exemplary embodiments, the drive shaft assembly 104 may be pneumatically or hydraulically actuated or powered electrically. In another embodiment, a rotating turntable or other mechanism may be provided in lieu of the drive shaft assembly 104.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112, one or more tire changing tools 114, 116 and 117 may be brought into physical contact or engagement with the tire 108 in the direction of arrow B (FIG. 1b) at respective locations proximate an outer periphery of the rim 106. The machine operator may visually move the tools 114, 116 and 117 into the proper position with respect to the tire 108 and wheel rim 106, and then the tire 108 and wheel rim 106 are rotated about the axis 112 with the tools 114, 116 and 117 engaged to the tire 108 to install or remove the tire.

The tool 114 is sometimes referred to as tire mount or demount tool. The tool 114 may include a wedge that is extended into an area between the wheel rim 106 and the tire 108 to separate an inner circumference of the tire 108 including the bead 118 (FIG. 1c) over the outer lip 119 (FIG. 1c) of the wheel rim 106 to remove the tire 108, or to engage the inner circumference of the tire 108 including the bead 118 on the outer lip 119 of the wheel rim 106 to install the tire 108. The tire 108 may be appropriately lubricated to facilitate easier removal and installation using the tool 114.

The tools 116 are sometimes referred to as bead breaker tools that exert pressure on the tire 108 to either break the tire bead seal 118 with the rim 106 or push the inner circumference of the tire 108 over the outer lip of the wheel rim 106 to install the tire 108. As shown in the exemplary embodiment in FIGS. 1a and 1b, two tools 116 are shown, one located above the tire 108 and the other located below the tire 108. In another embodiment, a single bead breaker tool could be provided.

The tools 117 are sometimes referred to as pressing tools. As shown in the exemplary embodiment in FIGS. 1a and 1b, two pressing tools 117 are shown that exert pressure on the tire sidewall in tire mounting and demounting procedures. Each pressing tool 117 is differently configured, one as a roller and the other having been adapted for stationary contact with the tire 108. The pressing tools 117 may be spaced from one another to maintain the tire bead 118 in a drop center 121 (FIG. 1c) of the wheel rim 106 during tire de-mounting procedures, or to push the tire bead 118 into the drop center 121 in a tire mounting procedure. While two or more pressing tools 117 are beneficial for mounting or de-mounting larger diameter tires and stiffer tires, one pressing tool may be provided in another embodiment and may be sufficient to change smaller diameter and more compliant tires.

The tools 114, 116, and 117 serve to supply sufficient tire insertion or removal forces at the correct angle and location with respect to the tire 108 such that the bead 118 of the tire 108 is forced out of or onto a bead seat on the wheel rim 106. While exemplary tire changing tools 114, 116, and 117 are illustrated, still other tire changing tools may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 114, 116 and 117 as depicted.

Like many known machines, the effectiveness of the tire changing machine 100 is largely dependent on the ability of its operator to prepare the rim 106 and correctly position the tire changing tools 114, 116 and 117 to install or remove the tire 108 from the wheel rim 106. The bead breaker tool 116 and the mount and demount tool 114 exert respective pressure on the tire 108 to seat or unseat the tire bead 118 from the rim 106 when installing or removing the tire 108. If any of the tools 114, 116 or 117 are inadvertently placed in contact with the rigid wheel rim 106 or the rather rigid sidewall of the tire 108, the applied forces generated by the machine 100 through the tools 114, 116 and 117 may damage the wheel rim, the tire, a TPMS sensor inside the wheel, other features of the wheel rim or tire, or components of the machine 100. Safety issues are posed by the large amounts of force that can be generated in such instances. Additionally, if the wheel rim 106 includes wheel weights and the wheel weights have not been removed, one or more of the tire changing tools 114, 116 and 117 can come in contact with a wheel weight installed at the rim edge, causing the wheel weight to slide as the wheel is rotated and potentially damaging the rim.

During tire mounting and demounting procedures significant forces can build up that have the potential to damage the tire bead 118, other portions of the tire 108, or the mount/demount tool 114 or other of the tire changing tools 116 and 117. By monitoring the tactile forces in mounting and demounting procedures, tool damage can be prevented by adjusting operation of the machine in response to the detected tactile forces. Such adjustments in operation of the machine may include stopping motor rotation in the drive assembly 104, reducing the speed of rotation in the drive assembly 104, reducing the motor torque applied during rotation of the drive assembly 104, or reducing the applied forces of one or more of the tools 114, 116 and 117.

More specifically, when the bead rollers 116 are used to exert pressure on the tire 108 to break the tire bead seal 118, the rollers 116 are first brought into contact with the tire 108 as near to the lip of the rim 106 as possible. Down force is applied to the upper roller 116 in a direction (indicated by arrow B in FIG. 1b) that is parallel to the wheel axis 112 to push the tire bead 118 off of the rim 106. If the roller 116 is inadvertently placed on the wheel rim 106, however, very large forces may be generated very quickly with very little movement between the upper roller 116 and the comparatively rigid and unforgiving rim that may result in damage to the rim 106, or to components of the machine. In contrast, if the roller 116 is correctly placed on the tire 108 there will be a more gradual increase in force along with movement of the tool as the tire bead 118 (FIG. 1c) is pressed away from the rim.

It has been found that further positioning of the upper roller 116 is often necessary to dislodge the tire bead 118 from the wheel rim 106. Specifically, it has been found that after a slight movement in the axial direction of arrow B it is then necessary to drive the roller 116 in a lateral direction (indicated by arrow C in FIG. 1b) that is perpendicular to the drive axis 112. This is necessary because otherwise the roller 116 will deform the sidewall of the tire 108 and then slide along the sidewall without removing the tire bead 118 from the wheel rim 106. If the roller 116 is moved toward the tire bead 118 it is able to act on a more stiff area of the tire which is typically closer to the bead and thereby remove the tire bead 118 from the wheel rim 106. The lateral movement of the rollers 116 in a direction transverse to the drive axis 112 as shown by arrow C presents additional opportunities for operator error in inadvertently placing the tool 116 in contact with the rim 106. Even if properly moved in the direction of arrow C to successfully dislodge the tire bead 118, the operator must remember to move the tool back in a direction opposite to arrow C before lifting it from the tire, or it will undesirably hit the wheel rim 106. Some operators are prone to overlooking this aspect of the procedure. As explained below, exemplary control systems provided in the machine 100 may automatically compensate for such difficulties and avoid human error in this regard.

As the wheel rim 106 and tire 108 are rotated about the axis 112 the tool 114 applies appropriately directed force to the tire 108 to either direct the tire 108 off of the wheel rim 106 (demounting) or onto the wheel rim 108 (mounting). The machine operator, however, may not have the tool 114 in the proper location, may not have the tire 108 in the correct position relative to the rim 106, or may rotate the wheel rim 106 at too high of a speed about the axis 112, all of which tend to place the tool in a bind. If the operator does not realize that the tool 114 is binding and continues with the procedure, damage can occur to the tire or to the tool.

In an effort to address difficulties in properly locating the tire changing tools 114 and 116 and undesirable consequences of improper tool placement, some machines are known having a sensory capability to detect a position of tools such as the tools 114 and 116 with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align bead breaker tools with respect to the wheel rim at predetermined locations.

Such features have enjoyed varying degrees of success in avoiding human error in positioning the tools, but are nonetheless subject to the limitations of the operators to correctly utilize such features. The tools 114 and 116 may still be incorrectly positioned on the rim or on the tire sidewall, creating undesirable operating conditions.

While perhaps less likely than for the tools 114 and 116, it is possible for a machine operator to improperly position the pressing tools 117, either in contact with the wheel rim 106 or at another location that could inadvertently cause damage to the tire 108, the rim 106 or component of the machine 100.

Even if the tools 114, 116 and 117 are correctly located on the tire 108, the applied force generated by the tools 114, 116 and 117 can still be quite large during tire installation and removal processes, and such forces can be somewhat difficult to control. Particularly during tire removal processes, a large buildup of force in the bead breaker tools 116, for example, can suddenly be released when the tire bead seal is broken and the tire 108 deflects away from its seated location on the rim 106, resulting in practically uncontrollable movement of the tool 116. This is particularly the case for pneumatically actuated tools where a rapid loss in back pressure occurs as the tire bead is loosened, but to some extent many different types of actuators pose similar issues. Consequently, some damage to the tire 108, the wheel rim 106, wheel sensors within the tire and wheel rim assembly, and/or machine components may result even when the tools 114, 116 and/or 117 are properly positioned. Likewise, the spontaneous release of large amounts of energy can be jarring to machine operators, as well as potentially hazardous.

To avoid undesirable effects due to misplacement of the tools 114, 116 and 117 on the tire 108 or due to improperly preparing the rim for tire removal, the machine 100 is provided with sensors, controls and interfaces described below that overcome numerous disadvantages of existing tire changing machines. The tools 114, 116 and 117 are coordinated by a control unit 120 that may include a controller (discussed below) and actuator components operatively connected to the controller for moving the tools 114, 116 and 117 to various positions to accommodate varying sizes and diameters of wheel rims 106. As will be explained below, the actuators may include, for example hydraulic cylinders, pneumatic actuators, and/or electric motors in illustrative embodiments. The tools 114, 116 and 117 may be independently movable from one another, in response to outputs from the control unit 120, along one or more axes of motion. The control unit 120 may accept exemplary inputs from known positioning encoders, Hall Effect sensors, and machine vision techniques to aid in the proper positioning of the tools 114, 116 and 117 with respect to the tire 108 and the rim 106.

A machine operator may manipulate one of the input selectors 110a or 110b, for example, which communicate with the control unit 120 to move the tools 114, 116 and 117 to desired positions. These input selectors may have the capability to override automated inputs made by a controller which is part of control unit 120. In illustrative embodiments, the input selectors 110a and 110b may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station 122 including a display 124 and an input device 126 including a keyboard or other input selectors may be optionally provided for the benefit of the operator. Still other features of the machine may be provided, such as tire inflation systems and the like familiar to those in the art.

In addition to sensors, controls and interfaces for input purposes, the tire changing machine 100 may be further equipped with or otherwise communicate with a database or data store including information regarding known wheel rim and/or tire features so that the machine tools can be appropriately controlled to avoid problematic positional conflicts discussed below when executing tire change procedures on a particular wheel rim and tire combination. In such an embodiment, the machine operator could identify and select a wheel rim and/or tire combination to the machine 100 using various techniques. For example, the machine operator may directly select from a list or menu of wheel rims and/or tires presented to the operator, and based on the operator selection the machine could retrieve or recall the necessary information from the database or data store. Alternatively, a barcode may be scanned either manually by the operator or automatically by the machine and used to identify or retrieve wheel rim and tire information for use by the machine. As yet another option, the machine 100 may include a reader device that is capable of automatically communicating with a device on the wheel rim or tire via radio frequency identification (RFID) techniques, further details of which are disclosed in U.S. Pat. No. 6,822,582 that is incorporated by reference herein. In still another example, the VIN number of a vehicle, or other vehicle identifying information corresponding to the tire and wheel rim, may be used to retrieve vehicle specific information including wheel rim and/or tire information as described in U.S. patent application Ser. No. 12/758,059 incorporated by reference herein. Machine vision techniques may likewise be used to identify certain features of wheel rims and tires. Still other techniques are possible to provide the necessary information for the machine to operate as described below, or to assist an operator in using the machine to establish appropriate reference inputs, including but not limited to reference points and the like.

As will be explained in relation to the following figures, the machine control system, which includes the control unit 120, also includes force detection elements 128 (FIG. 1b) and position detection elements 129 (FIG. 1a) for more effective control of the tools 114, 116 and 117 in use. While one force detecting element 128 and two positioning elements are depicted, it is understood that other numbers of force and position detection elements may be provided in various locations on the machine 100. As shown in FIG. 1b, the force detection element 128 may be provided on a tool mounting bracket, although it could be located elsewhere in the machine such as a mounting element for a tool actuator that couples the actuator to the machine supporting structure. For example, as the tool actuator moves the tool 114 toward or away from the rotation axis to radially position the tool 114 relative to the drive axis 112, or a tool actuator that moves the tool toward and away from the rim and tire in a direction parallel to the drive axis 112, force may be detected as the tool engages the tire 108 and/or the wheel rim 106. Likewise, the position detecting elements 129 are shown at particular locations in FIG. 1a, but they could be located elsewhere in other embodiments. Also, various types of sensors capable of use for the force and position detection elements 128 and 129 are explained below.

As will become evident below, the force and position detection elements 128, 129 and control components associated with them are beneficially provided to facilitate safer and smoother tire installation and removal processes in an optimized manner with reduced potential for hazardous conditions to the machine operator. The force and position detection and control features facilitate beneficial methods of tire changing using the machine to perform various tire change procedures. The force detection and position detection elements 128 and 129 and controls such as those described below further provide advantageous informational feedback to the machine operator concerning expected or normal operating conditions to confidently guide the operator through a tire change procedure. Still further, the force and position detection elements 128 and 129 and control features also facilitate detection of abnormal or undesirable operating conditions that may otherwise result in damage to the rim, tire, or the tire changing machine. Operator safety may be enhanced with intuitive operator interfaces and controls.

The force detection assemblies, methods and systems disclosed below advantageously limit applied force to prevent damaging a tire, wheel rim, or tire changer part. Also, when used in combination with a location sensor or other positioning system known in the art, a determination can be made as to whether the force is effective or not (i.e. whether a drop in force was measured as the tire bead 118 (FIG. 1c) is moved out of the bead seat of the wheel rim 106) so that appropriate action can be taken, including but not limited to activating an error mode wherein further application of force by one or more of the tools 114, 116 and 117 is suspended, operating actuator elements for the tools 114, 116 and 117 to anticipate or respond to a sudden drop in force as the tire bead seal breaks to provide more control of the tools 114, 116 and 117 after the tire bead seal is broken, and providing a warning to the operator via a display or haptic feedback elements to let the operator know how much force has been released. Such force sensing and detecting capability may allow tire change procedures to be safely automated.

Exemplary control systems are described below in relation to FIGS. 2-9 including tactile feedback features allowing more effective control of the machine 100 and its components, and exemplary tire change procedures, methods, algorithms and machine routine responsive to such tactile feedback are described below in relation to FIGS. 10-19. The various components utilized by the machine in tire changing operations may be driven by various types of actuators, including actuators providing rotational output movement (i.e., rotary actuators), and actuators providing linear output movement (i.e., linear actuators). The actuators for the components may be powered in various ways, including electric, hydraulic and pneumatic power.

As will be seen from the exemplary embodiments discussed below, various types of force sensors may be used as the force detection elements 128 for the tire changing tools or other components. For example, the force detection elements 128 may include electrical sensors (e.g., voltage, current, inductive, capacitive, magnetic or resistive sensors), pressure sensors, optical sensors, imaging sensors, load bearing sensors, force sensors, acceleration sensors, torque sensors, deflection sensors and displacement sensors may be utilized with various types of actuators to provide signals indicative of force (either directly or indirectly wherein force could be calculated or otherwise determined based on the feedback signal) applied by or generated in a component of the machine during a tire change procedure. Combinations of force sensors for different components may be utilized, and force may be detected along multiple axes of movement for the same or different components. While the following exemplary systems and procedures are described primarily in relation to operation of the tire changing tools, it is understood that signals directly or indirectly indicative of force could be obtained by monitoring components other than the tools and tool actuators, such as components in the drive assembly or still other components in the machine.

In addition to tactile force feedback, in certain embodiments the machine control systems are enhanced with one or more position detecting sensors. A variety of position detecting sensors, including but not limited to Hall Effect sensors, capacitive sensors and Linear Variable Differential Transformer (LVDT) sensors familiar to those in the art, may be utilized to directly indicate a position of a movable machine component, or to indirectly indicate a position of a movable machine component by detecting speed or acceleration of a moving component. In other embodiments, positioning encoders, machine vision techniques or still other position detection elements may be utilized to allow a position, either linearly or rotationally, of one or more components to be determined.

Positional information for rotational movement and linear movement among multiple axes of motion for a variety of machine components can be used in combination with force detection features to automate a variety of tire change procedures in whole or in part to provide machines of varying sophistication, and to detect a variety of normal and abnormal operating conditions of the machine.

Figure 2:
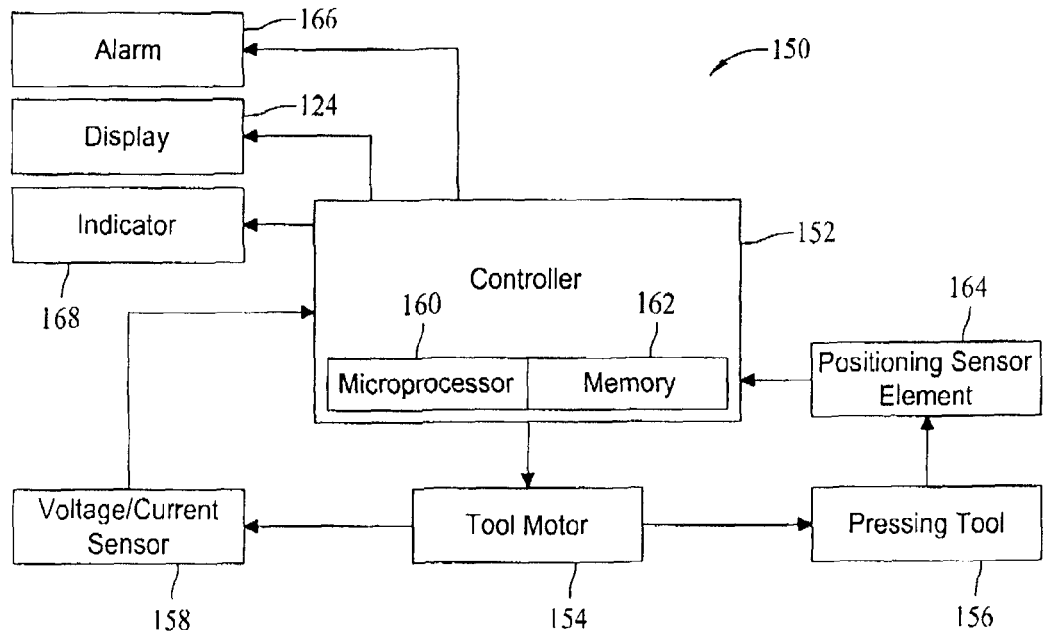
FIG. 2 is a block diagram of a first exemplary control system for the machine shown in FIG. 1.

FIG. 2 is a block diagram of a first exemplary control system 150 that may be used with the machine 100 for more optimal use and control of the machine 100 to change tires. As shown in the embodiment of FIG. 2, the control system 150 generally includes a controller 152, an actuator in the form of an electric motor 154 for moving a component such as a tool 156, and an electrical sensor 158 monitoring an electrical parameter, for example, voltage or current, associated with the motor 154. An increase in voltage or current is an indication that force exerted by the tool 156 is also increasing. Likewise, a decrease in voltage or current is an indication that the force exerted by the tool 156 is decreasing. This relationship between voltage and current and force is known or can be determined for any given motor 154 and can therefore be used to determine not only an increase or decrease in force but also the amount of force. Measuring an electrical parameter such as current or voltage provides the tire changer machine 100 with tactile feedback on how much force is being applied by the tire changer device. Other electrical parameters can be sensed and monitored using known sensors to provide alternative feedback signals indicative of force, such as capacitance, inductance, resistance or magnetic properties.

While a single motor 154 and electrical sensor 158 is illustrated, it is recognized that multiple actuator motors and multiple electrical sensors may be provided in further embodiments wherein independent movement of tools or multiple degrees of freedom of movement are desirable for one or more tools. For example, two actuators may be provided each moving the tool 156 in different directions or in different ways and a sensor may be provided to detect force associated with the different directions or manners of movement.

A variety of electrical motors are available for use as the electric motor 154 to move and position the tools relative to the wheel rim 106 and tire 108, as well as to provide appropriate force to install and remove a tire 108 from the wheel rim 106 (FIGS. 1a, 1b and 1c). Gearsets, cam followers, and other linkages may be provided to produce desired motion of tool 156 when the motor 154 is energized by the controller 152.

The electrical sensor 158 monitors electrical parameters associated with the motor 154 and provides a signal input to the controller 152 for feedback control purposes, detection of error conditions, and for optimization of the machine for an operator. A variety of voltage and current sensors, as well as other types of electrical sensors for monitoring other electrical parameters and characteristics, are known and commercially available from a variety of manufacturers, any of which may be used to provide a feedback signal input to the controller 152 that is indicative of the load on the motor 154 in use.

The tool 156 may correspond to any of the tools 114, 116 and 117 shown in FIGS. 1a through 1c, or to still other tools provided on the tire changing machine 100. The controller 152, in response to the feedback signal from the sensor 158, operates the motor 154 in the manner explained below to avoid undesirable operating conditions. The motor 154, in turn, advances or withdraws the tool 156 toward and away from the wheel rim 106 and tire 108 (i.e., in the direction of arrows B and C in FIG. 1b).

The controller 152 may reside in the control unit 120 (FIG. 1a) or at another location, and may be the same or different from the main or master controller for the machine 100. That is, the controller 152 may be a dedicated controller for the tool 156, or the functions of the controller 152 may be integrated or combined with another controller in the machine 100.

In various embodiments, the controller 152 may be for example, a microcomputer, a programmable logic controller, or other processor-based device. Accordingly, the controller 152 may include a microprocessor 160 and a memory 162 for storing instructions, control algorithms and other information as required to function in the manner explained below. The controller memory 162 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 152 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize the tire mount or demount process. The tire profiles may include detailed data regarding dimensional aspects of tires to be changed and other information concerning the tires that may be useful and beneficial to the machine operator or the control system as explained below.

A positioning element 164 optionally may be included as well and provides a feedback signal to the controller 152 that is indicative of the position of the tool 156. The positioning element 164 may be a position encoder or other sensor, or may include machine vision components and the like familiar to those in the art. When so provided, the control system 150 can monitor position and force associated with the tool 156, and can compare detected position and force conditions to confirm correct operation is taking place or detect error conditions and take appropriate action to prevent undesirable consequences.

The positioning element 164 is particularly beneficial when the tool 156 corresponds to the bead roller tool 116 (FIGS. 1b and 1c) as it is driven first in the direction of arrow B (FIG. 1b) and then in the direction of arrow C (FIG. 1b), or alternatively in both the directions of arrows B and C at once, during tire changing operations to fully remove the tire bead 118 (FIG. 1c) from its seated position on the wheel rim 106. After the tire bead 118 has been fully removed from its seated position, the tool 116 (corresponding to the tool 156 in FIG. 2) is then raised in a direction parallel to the wheel axis 112 in a direction opposite to arrow C (FIG. 1b), in order to remove it from the wheel rim/tire work area. Since the tool 116 has been moved toward the wheel rim 106 in the direction of arrow C, the roller 116 would undesirably contact the wheel rim 106 if the roller were simply raised straight up. By monitoring the position of the tool 156 (corresponding to the tool 116 in FIG. 1*b*) using the positioning element 164 it is possible to know the location at which the tool 156 must be moved away from the wheel rim 106 (in a direction opposite to arrow C in FIG. 1*b*) to prevent tool-to-wheel rim contact, and the controller 152 can automatically undertake returning the tool 156 back to a home position and remove any opportunity for mistake by the human operator of the machine 100. As the tool 156 is returned, force and position are monitored for abnormal behavior. For instance, if the force for the tool 156 increases and the position change for tool 156 unexpectedly slows down, or even stops, the tool 156 might be prevented from moving because it is caught on the tire and/or rim. Once such an abnormality is detected, appropriate responsive action may be taken in response to unexpected or abnormal behavior of the tool 156 in use. Examples of responsive action include, but are not limited to, providing a warning to the operator, discontinuing movement of the tool 156, or repositioning of the tool 156 to try get around whatever is preventing the tool 156 from returning to the home position.

An alarm element 166 may be connected to the controller 152, and in various embodiments the alarm element may be audio, tactile and/or visual in nature, to alert a machine operator of problematic operating conditions of the machine 100. Once an alarm condition is detected, instructions or explanation may be presented to the machine operator via the optional display 124, a pre-recorded audio message, or by other means so that the operator can take appropriate measures to mitigate negative consequences.

As explained in further detail below, actions taken by the controller 152 may disable or de-energize the motor 154 when a predetermined maximum force limit is experienced, may disable or de-energize the motor 154 when expected movement of the tool 156 does not occur, or may control the motor 154 in anticipation of or response to a sudden drop in resistance by the tire 108 when the seal with the wheel rim 106 is finally broken.

An optional indicator 168 may also be provided for the machine operator's benefit to provide real time informational feedback for normal or expected operating conditions of the machine during a tire change procedure. As such, and in contrast to the alarm element 166, the indicator 168 provides operator feedback indication concerning successful, error free operating conditions as detected by the controller 152. That is, the indicator 168 may provide confirmation that the force signal(s) are in an acceptable state and the machine and its tools is being used properly. The indicator 168 may provide step by step, real time feedback to the machine operator concerning the acceptable state of the machine. The indicator 168, like the alarm element, may be audio, tactile and/or visual in nature, to indicate satisfactory use or operation of the machine. Instructions or explanation may be presented to the machine operator via the optional display 124, a pre-recorded audio message, or by other means to indicate steps successfully performed in a tire change procedure, and optionally prompt the operator to perform next steps in the procedure.

It is understood that the functionality of the alarm element 166 and the indication element 168 could be combined into a single device if desired as long as different audio, tactile and/or visual cues were provided to distinguish positive operation of the machine without error and negative operation of the machine with error. Alternatively, the alarm element 166 and the indication element 168 may be separate devices in separate locations on the machine to aid the operator in rapidly distinguishing positive and negative feedback from the controller 152. It is also contemplated that if the optional display 124 is provided, it may obviate any need for separately provided alarm elements and indicator elements as both alarm and indication features could be presented via the display 124.

Figure 3:
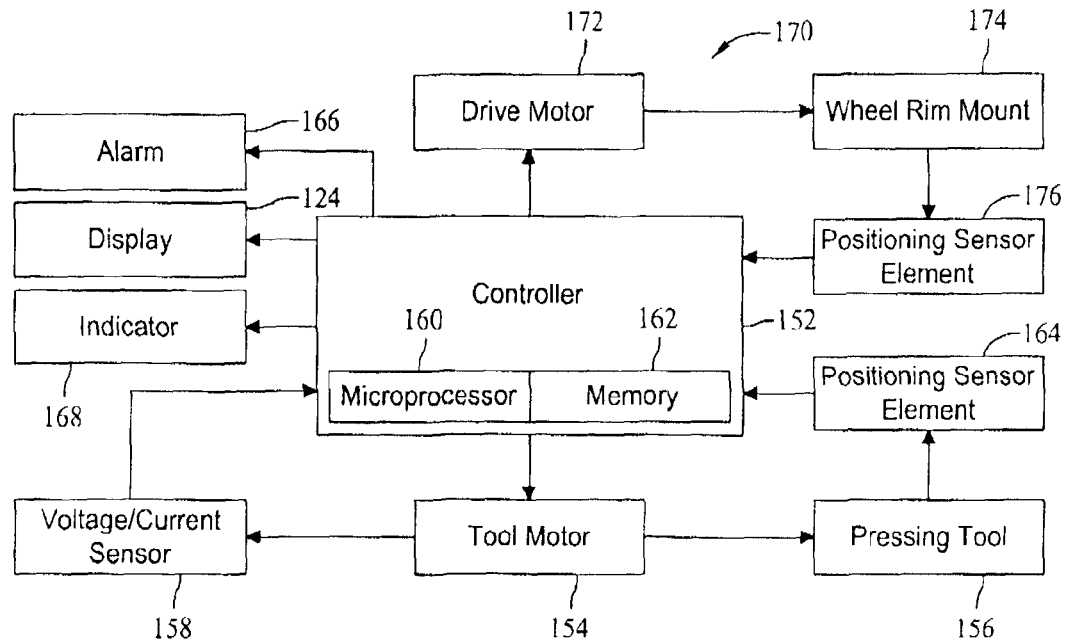
FIG. 3 is a block diagram of a second exemplary control system for the machine shown in FIG. 1.

FIG. 3 is a block diagram of a second exemplary control system 170 that may be used with the machine 100 (FIGS. 1*a*, 1*b*, 1*c*) for more optimal use and control of the machine 100 to change tires. As shown in the embodiment of FIG. 3, the control system 170 is similar in some aspects to the control system 150 shown in FIG. 2. Like the control system 150, the control system 170 includes the controller 152 coupled to a motor 154 that moves the tool 156. The voltage or current sensor 158 senses the amount of force exerted by the motor 154 and feeds that information back to the controller 152. The position sensor element 164 provides the controller 152 with position information for the tool 156.

Unlike the control system 150, the control system 170 further includes a portion of the machine drive assembly 104, such as a drive motor 172 (also shown in FIG. 1*c*) for controllably rotating a wheel rim mount 174 that clamps or otherwise retains the wheel rim 106 (FIG. 1*c*) as the machine drive assembly 104 rotates the wheel rim 106 about the drive axis 112 (FIG. 1*a*) in a tire changing procedure. Various wheel rim mounts 174 are known that engage the wheel rim 106 in various ways, any of which may be used in exemplary embodiments. The wheel rim mount 174 is mounted stationary to the drive assembly 104 and rotates with the drive assembly 104. The drive assembly 104 may include a center post or shaft provided with the wheel rim mount 174. As another illustrative example, the drive assembly may alternatively include a rotating turntable or spindle with the wheel rim mount 174 provided thereon.

As shown in FIG. 3, the control system 170 further includes a position sensor element 176 (also shown in FIG. 1*c*) for providing the control system 170 with a wheel mount rotation position. Thus, the controller 152 may receive feedback indicating the degree of rotation of the wheel rim mount 174 by the drive assembly, which is driven by the drive motor 172.

Thus the control system 170 utilizes numerous tactile feedback control inputs from numerous reference points as the tire changing machine is used, including feedback to the controller 152 concerning a rotational position of the wheel rim mount 174 provided by the position sensor 176, feedback to the controller 152 concerning tool force provided by the electrical sensor 158, and feedback to the controller 152 concerning tool position information provided by the sensor 164. The controller 152 uses this tactile feedback information to control the tool motor 154, the drive motor 172, the optional display 124, the optional alarm element 166, and the optional indicator 168.

Figure 4:
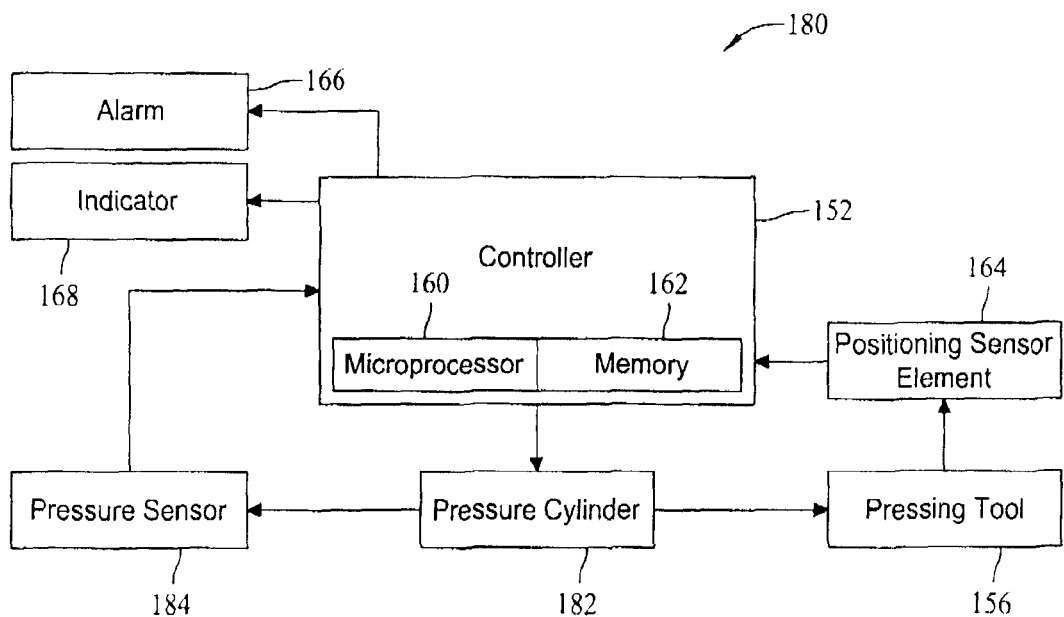
FIG. 4 is a block diagram of a third exemplary control system for the machine shown in FIG. 1.

FIG. 4 is a block diagram of a third exemplary control system 180 that may be used with the machine 100 (FIGS. 1*a*, 1*b*, 1*c*) for more optimal use and control of the machine 100 to change tires. As shown in the embodiment of FIG. 4, the control system 180 is similar in some aspects to the control system 150 (FIG. 2), but uses a different type of tool actuator and different forms of tactile feedback.

The control system 180 includes the controller 152 coupled to a tool actuator in the form of a pressure cylinder 182 that houses a reciprocating piston or ram for moving the tool 156, and a pressure sensor 184 monitoring a fluid pressure associated with the pressure cylinder 182. In an exemplary embodiment, fluid pressure associated with the cylinder 182 can be sensed electronically with an inline pressure sensor 184. As fluid pressure increases or decreases, a corresponding signal from the pressure sensor 184 is communicated to the controller 152 to provide tactile feedback.

In different embodiments, the pressure cylinder 182 may be hydraulically actuated or pneumatically actuated, with the pressure sensor 184 providing a signal to the controller 152 that is indicative of the force or pressure exerted by the pressure cylinder 182 with the tool 156. While a single pressure cylinder 182 and sensor 184 is illustrated, it is recognized that multiple cylinders and multiple sensors may be provided in further embodiments wherein independent movement of tools or multiple degrees of freedom of movement are desirable for one or more tools. The positioning element 164 and the alarm element 166 or the indicator 168 may also optionally be provided. The controller 152 operatively responds to this tactile feedback information as further described below.

Figure 5:
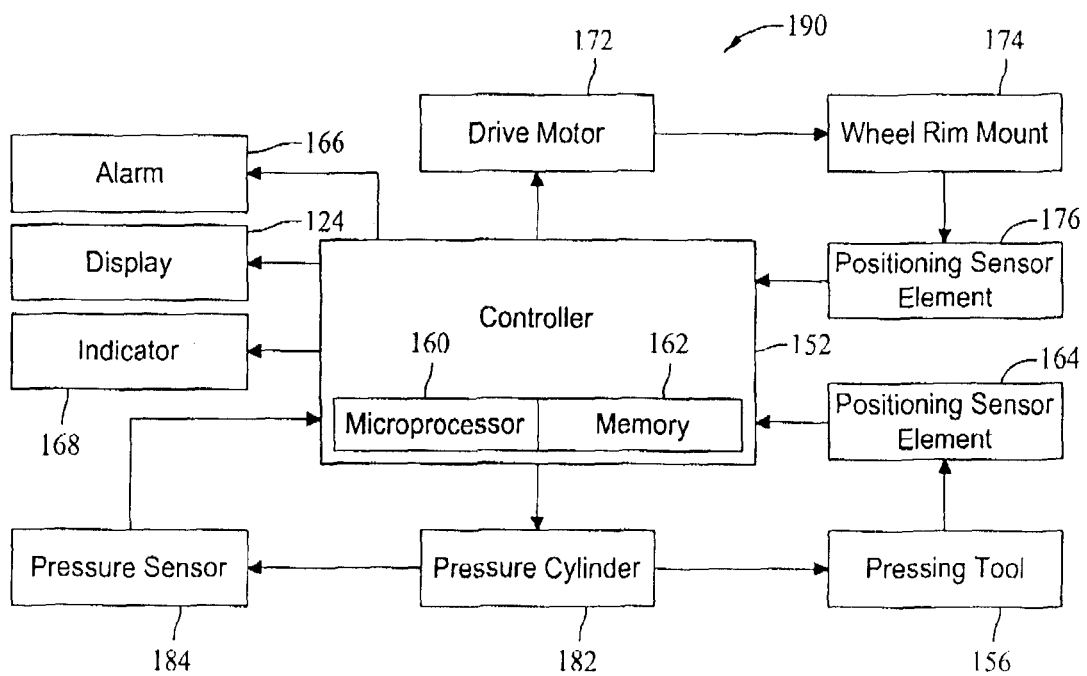
FIG. 5 is a block diagram of a fourth exemplary control system for the machine shown in FIG. 1.

FIG. 5 is a block diagram of a fourth exemplary control system 190 that may be used with the machine 100 (FIGS. 1*a*, 1*b*, 1*c*) for more optimal use and control of the machine 100 to change tires. As shown in the embodiment of FIG. 5, the control system 190 is similar in some aspects to the control system 180 shown in FIG. 4. Like the control system 180, the control system 190 includes the controller 152 coupled to an actuator in the form of a pressure cylinder 182 that houses a reciprocating piston or ram for moving the tool 156, and a pressure sensor 184 monitoring a fluid pressure associated with the pressure cylinder 182. Fluid pressure associated with the cylinder 182 can be sensed electronically with an inline pressure sensor 184.

As fluid pressure increases or decreases, a corresponding signal from the pressure sensor 184 is communicated to the controller 152 to provide tactile feedback to the controller 152. A position sensor element 164 provides the controller 152 with position information for the tool 156.

The control system 190 further includes the motor 172 for controllably rotating the wheel rim mount 174. The control system 190 also includes a position sensor element 176 for providing the control system 190 with wheel rim mount position. The wheel rim mount 174 and the position sensor element 176 for the wheel rim mount 174 are described above in reference to FIG. 3.

Tactile feedback information concerning a position of the wheel rim mount provided by the sensor element 176, sensed force of the tool 156 provided by the pressure sensor 184, and position information for the tool 156 provided by the sensor 164 are each provided to the controller 152. The controller 152 uses this tactile feedback information to control the tool pressure cylinder 182, the drive motor 172, optional display 124, and optional alarm element 166 and indicator 168 as further described below.

Figure 6:
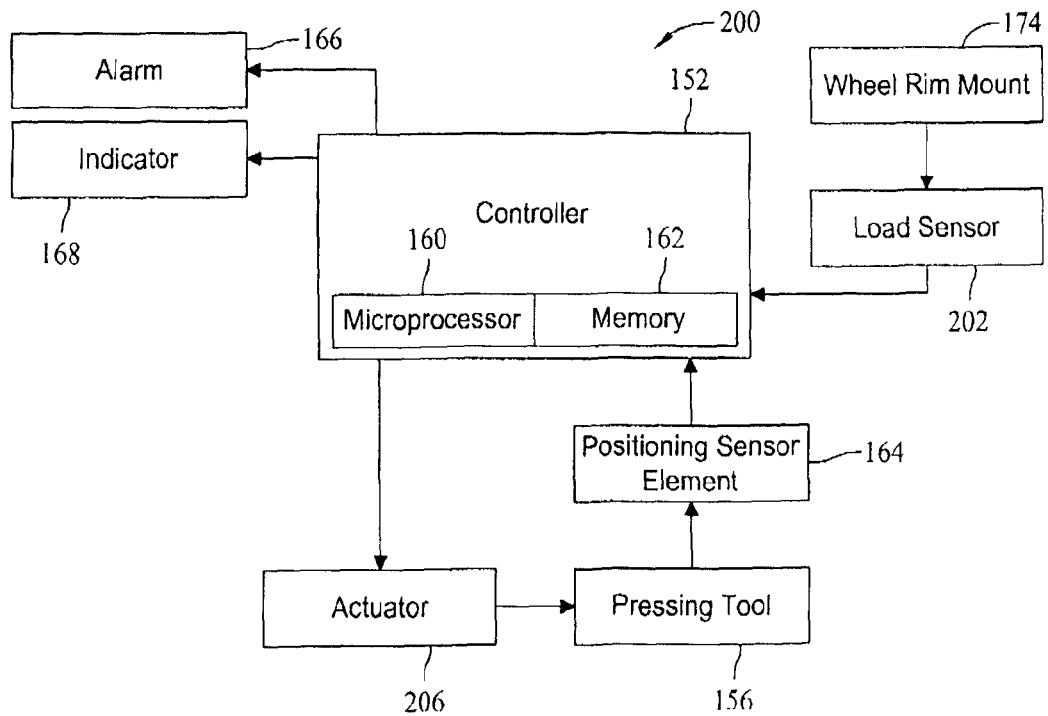
FIG. 6 is a block diagram of a fifth exemplary control system for the machine shown in FIG. 1.

FIG. 6 is a block diagram of a fifth exemplary control system 200 that may be used with the machine 100 (FIGS. 1*a*, 1*b*, 1*c*) for more optimal use and control of the machine 100 to change tires. As shown in the embodiment of FIG. 6, the control system 200 is similar in some aspects to the control systems described above.

The control system 200 includes the controller 152 receiving an input signal from a load sensor 202 associated with the wheel rim mount 174 of the machine 100. In such an embodiment, an indirect force measurement is obtained by monitoring a reaction force exerted by the wheel rim 106 and tire 108 to the wheel mount 174. A tool actuator 206, which may be any of the actuators described herein, is operationally responsive to the controller 152 and moves the tool 156 toward or away from the wheel rim 106 and the tire 108. When the tool 156 is utilized in tire changing operations, reaction forces are experienced at the wheel rim mount 174 that may be monitored with the load sensor 202.

As an illustrative example, the wheel rim mount 174 may be provided on a center post or shaft of the drive assembly 104 (FIG. 1*a*) and the load sensor 202 may be a load sensing bearing associated with the center post of the shaft. One such load sensing bearing suitable for use as the load sensor 202 is manufactured by SKF for vehicles where the bearing supports the weight of a vehicle and yet measures the force exerted on the bearing in 5 degrees of freedom. Another suitable load sensor 202 is a bearing ring available from Kistler Instrumente AG for measuring cutting forces on milling machines and other industrial equipment.

As another illustrative example, the wheel rim mount 174 may be provided on a rotating turntable or spindle, and the load sensor 202 may be a force sensing bearing ring. Suitable force sensing rings are also made by Kistler.

The load sensor 202 provides a signal to the controller 152 that is indicative of the force or pressure exerted by the tool actuator 206 and the tool 156. While a single tool actuator 206 and a single load sensor 202 is illustrated, it is recognized that multiple actuators and more than one load sensor may be provided in further embodiments wherein independent movement of tools or multiple degrees of freedom of movement are desirable for one or more tools. The positioning element 164 and the alarm element 166 and indicator 168 may also optionally be provided.

Figure 7:
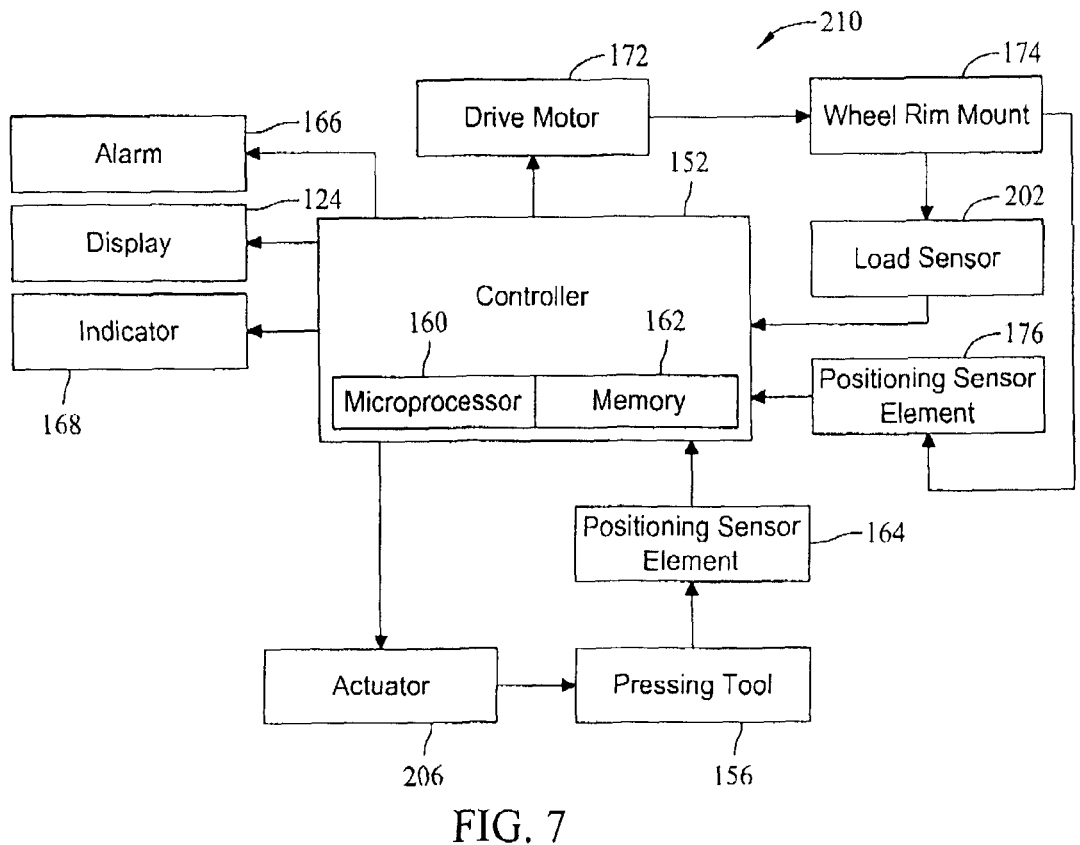
FIG. 7 is a block diagram of a sixth exemplary control system for the machine shown in FIG. 1.

FIG. 7 is a block diagram of a sixth exemplary control system 210 that may be used with the machine 100 (FIGS. 1*a*, 1*b*, 1*c*) for more optimal use and control of the machine 100 to change tires. As shown in the embodiment of FIG. 7, the control system 210 is similar in some aspects to the control system 200 described above.

The control system 210 includes the controller 152 receiving an input signal from the load sensor 202 associated with a wheel rim mount 174 of the machine 100. As described above, an indirect force measurement is obtained by monitoring a reaction force exerted by the wheel rim 106 and tire 108 to the wheel rim mount 174. A tool actuator 206, which may be any of the actuators described above, is operationally responsive to the controller 152 and moves the tool 156 toward or away from the wheel rim 106 and the tire 108. When the tool 156 is utilized in tire changing operations, reaction forces are experienced at the wheel rim mount 174 that may be monitored with the load sensor 202.

As shown in FIG. 7, the control system 210 further includes the drive motor 172 for controllably rotating the wheel rim mount 174. The control system 210 also includes the position sensor element 176 for providing the control system 210 with wheel rim mount position.

Various types of tactile feedback information may therefore be fed back to the controller 152, including information concerning a position of the wheel rim mount 174 provided by the position sensor 176, information concerning tool force provided by the load sensor 202, and information concerning a position of the tool 156 provided by the position sensor 164. The controller 152 uses this tactile feedback information to control the tool actuator 206, the drive motor 172, optional display 124, and optional alarm element 166 and indicator 168 as explained below.

Figure 8:
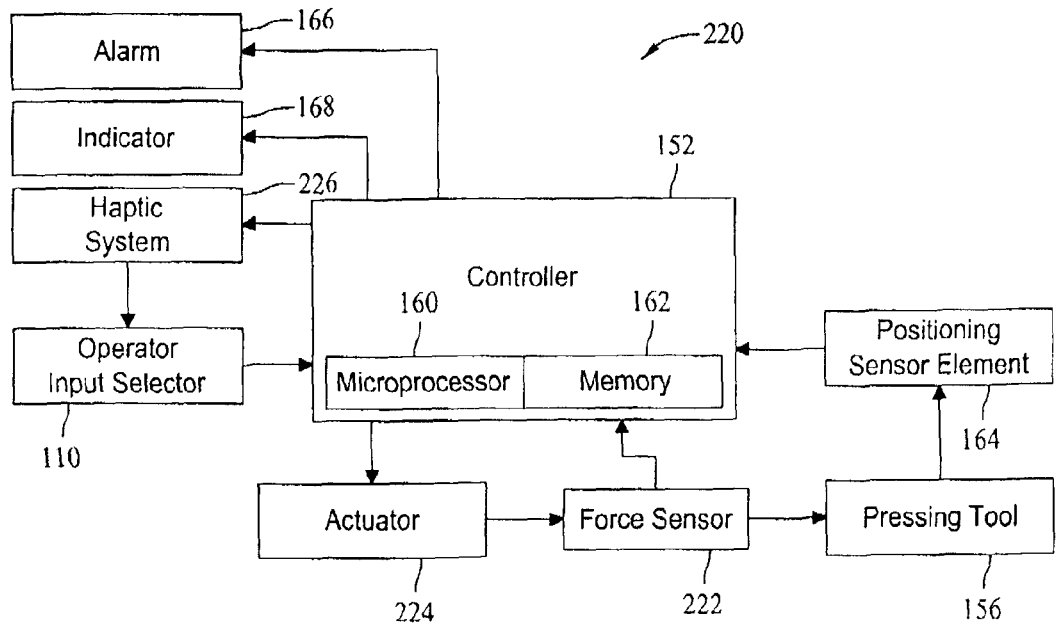
FIG. 8 is a block diagram of a seventh exemplary control system for the machine shown in FIG. 1.

FIG. 8 is a block diagram of a seventh exemplary control system 220 that may be used with the machine 100 (FIGS. 1*a*, 1*b*, 1*c*) for more optimal use and control of the machine 100 to change tires. As shown in the embodiment of FIG. 8, the control system 220 is similar in some aspects to the control systems 150 described above.

The control system 220 includes the controller 152 receiving an input signal from a force sensor 222 associated with a tool actuator 224 carrying the tool 156, in addition to the position sensor 164. In various embodiments, the actuator 224 may be any of the actuators described above, or still other actuators known in the art. The force sensor 222 may be any of the sensors previously described, or additionally may be a flexible, resistive sensor such as a Flexiforce™ sensor by Tekscan, a piezo sensor, a strain gage load cell, or still other sensors familiar to those in the art.

Recognizing that the tire changing machine 100 (FIGS. 1a, 1b, 1c) typically involves a human operator moving the tool 156 to a particular location on the assembly of the wheel rim 106 and tire 108 (FIG. 1a), a haptic system 226 is further provided and is in communication with the controller 152 and an operator input selector 110 for operating the actuator 224 associated with the tool 156. The haptic system 226 is operationally responsive to the controller 152 and is activated by the controller 152 in response to signals from the force sensor 222 and positioning sensor 164. The haptic system 226 provides sensory feedback to the human operator to provide the operator some guidance regarding how much force to apply at any given point in the tire mount or demount process. In contemplated embodiments, the haptic system 226 could be implemented on an input selector 110 such as a foot pedal, joy stick, lever, button, switch or other element operable with the operator's hands or feet, or that otherwise interfaces with the operator's sense of touch.

Various types of haptic devices and systems are known and may be used, with the haptic system 226 changing the behavior of the input selector 110 to provide tactile feedback to the human user that engages the input selector 110. In an exemplary embodiment, the haptic system 226 may vary the resistance of the input selector 110 as the operator attempts to manipulate it to move the tool 156. Alternatively the haptic system 226 may cause the input selector 110 to shake and/or vibrate as a warning to the human operator that sufficient force has been applied with the tool 156 and to use appropriate caution in applying further force.

In one example of the control system 220 in use, once the human operator is satisfied with the location of the bead breaker, he or she starts applying force to the tire by manipulating the input selector 110, thereby causing the controller 152 to operate the actuator 224 to move the tool 156 to engage the tire 108 on the machine 100. If the resultant force applied to the tire 108 by the tool 156, as detected by the force sensor 222, continues to increase with little or no movement of the tool 156, as determined by the positioning element 164, the haptic system is activated by the controller 152 so that the effort the human operator must exert at the input selector 110 to continue applying more pressure also increases.

On the other hand, if the force applied by the operator via the input selector 110 results in the tire bead 118 (FIG. 1c) moving from the bead seat of the wheel rim 106 then the haptic system 226 is operated by the controller 152 to decrease an amount of effort the operator must exert to continue to operate the tool 156.

If the tool 156 has moved the tire bead from the bead seat and the operator continues to apply pressure via the input selector 110, resulting in rapid movement of the tool 156, the haptic system 226 is operated by the controller 152 to create more feedback to the operator resulting in the operator having to exert more effort to increase pressure. The effect of the haptic system 226 opposing efforts of the operator serves to prevent the operator from mistakenly applying an inappropriate amount of force that may result in damage or loss of control of the tool 156 during one or more portions of a tire mounting or demounting operation.

As another example of the control system 220 in use, the haptic system 226 could make the input selector shake or vibrate when the tire bead 118 has been moved from the bead seat of the rim 106. Such shaking or vibration is an indication to the operator that additional force application with the tool 156 is inadvisable, and can coach the operator to successfully and properly use the tool 156. For example, the operator can take appropriate care not to break any wheel sensor such as tire pressure (TPMS) sensors that may be positioned on the inside cavity of the wheel rim/tire assembly by reducing the applied force as a result of the haptic system 226 giving feedback to the operator that excessive force is being applied.

In still other embodiments, the haptic system 226 may also include more subtle feedback features for the benefit of the operator such as providing one or more lamps or other illumination element with adjustable intensity. In such an embodiment, the controller 152 may adjust or change the brightness of emitted light to represent the applied force to the machine operator. In such an embodiment, the light may become brighter as more force is applied and dimmer as less is applied. As another example, one or more light elements could selectively be turned on or off without adjusting the intensity of illumination. Similar variations are possible using different sounds or sounds of varying intensity instead of light. Combinations of sounds and light are likewise possible.

Figure 9:
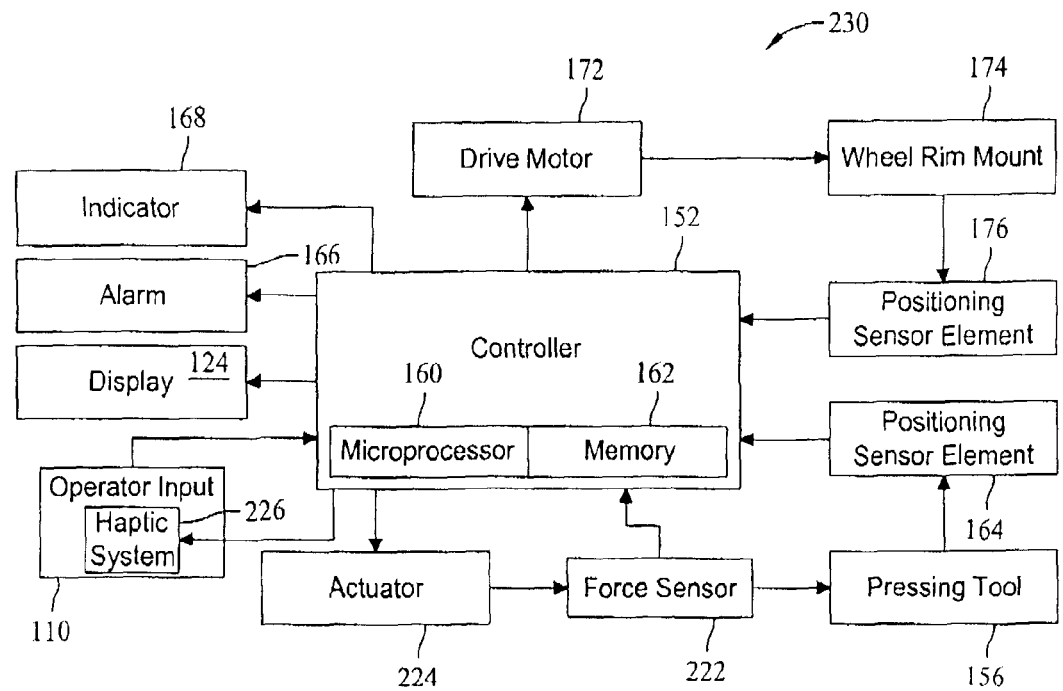
FIG. 9 is a block diagram of an eighth exemplary control system for the machine shown in FIG. 1.

FIG. 9 is a block diagram of an eighth exemplary control system 230 that may be used with the machine 100 (FIGS. 1a, 1b, 1c) for more optimal use and control of the machine 100 to change tires. As shown in the embodiment of FIG. 9, the control system 230 is similar in some aspects to the control systems described above.

The control system 230 includes the controller 152 receiving an input signal from a force sensor 222 associated with a tool actuator 224 carrying the tool 156. In various embodiments, the actuator 224 may be any of the actuators described above, or still other actuators known in the art. The control system 230 also includes the drive motor 172 receiving input from controller 152 and used for controlling the rotational position of the wheel rim mount 174. The wheel rim mount position sensor 176 is also included to provide controller 152 with input indicating the rotational position of the wheel rim.

The haptic system 226 as shown is part of the operator input 110 and is operationally responsive to controller 152. The controller 152 activates the haptic system 226 in different ways depending on inputs the controller 152 receives from the wheel rim mount position sensor 176, tool position sensor 164, and actuator force sensor 222.

While various control systems are illustrated in FIGS. 2-9, it is contemplated that aspects of the control systems described could be selectively combined to provide still other variations of control systems. For example, the haptic system 226 described in relationship to FIGS. 8 and 9 could be provided in the control systems shown in FIGS. 2-7. As another example, it is contemplated that the controller 152 could monitor and appropriately control several different types of actuators (e.g., electric motors or pneumatic or hydraulic cylinders) using feedback signals from different types of sensors. The exemplary control systems are scalable to accommodate various numbers of tire changing tools, and sensors may be provided in redundant fashion (e.g., sensors may be provided that are associated with the actuators of the tire changing tools and the wheel rim mount) to provide fall back features to ensure failsafe operation in the event that one of the sensors malfunctions.

Figure 10:
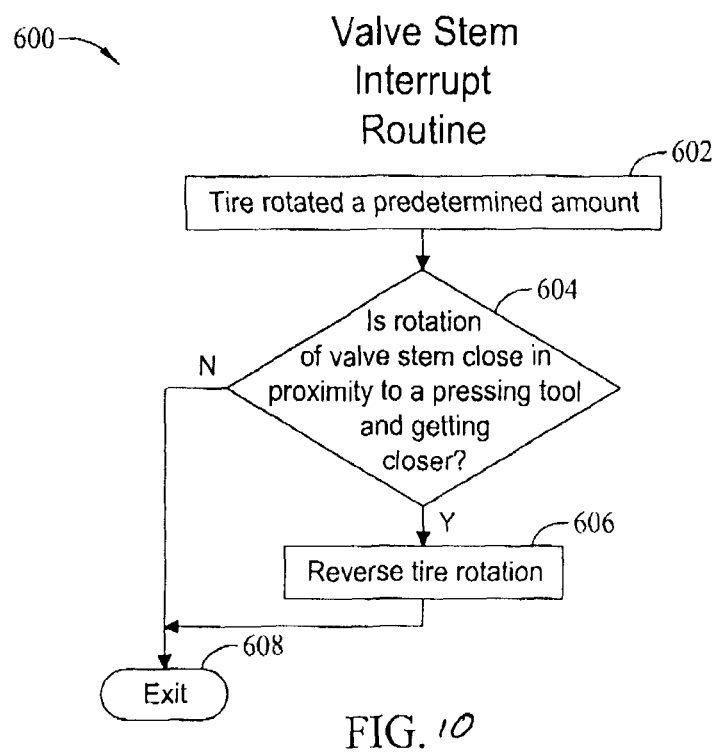
FIG. 10 illustrates an exemplary valve stem interrupt routine.

An exemplary Valve Stem Interrupt Routine is illustrated in FIG. 10 as method 600. The method 600 detects the location of the valve stem and reacts to it. In method 600, the tactile feedback for sensed tire rotation is continually sent to the controller 152 at step 602. The controller 152 determines at step 604 if the rotational location of the mounted tire's valve stem is such that a tool is near the valve stem. If the valve stem of the mounted tire is near a tool and getting closer, the tire rotation is reversed by the controller at step 606.

An alternative Valve Stem Interrupt Routine would be to use the tactile feedback and have the controller 152 remove some or all of the forces on the tool as the valve stem location is rotated past the tool. It is important not to apply too much force in the area of a valve stem because of the high probability of the valve stem to have a tire pressure monitoring system (TPMS) sensor which could be damaged in the event that too much force is applied.

As noted above, it is important when operating the tire changer machine 100 not to apply too much force in the area of a valve stem of a tire 108. Further, there is a high probability that the area proximate the valve stem includes a wheel sensor, such as a tire pressure monitoring system (TPMS) sensor, that could inadvertently be damaged in the event that it is exposed to too much force. That is, the area proximate the valve stem in many cases can be presumed to include a sensitive feature such as a TPMS sensor that could be damaged at threshold force levels that other areas of the rim or tire could easily withstand without damage. Thus, as used herein, a "sensitive feature" shall refer to an attribute of the tire and rim that is vulnerable or susceptible to damage at force levels that are otherwise safe and acceptable but for the presence of the sensitive feature, and therefore are of particular interest from a controls perspective as the machine is used.

As a tire and wheel rim is rotated on the machine, the tire and/or wheel rim may include one or more sensitive features (and corresponding sensitive areas) corresponding to the location of the sensitive features, and non-sensitive features (and corresponding non-sensitive areas) at locations apart from the sensitive features. Preferably, the machine controls should effectively distinguish between the sensitive and non-sensitive features and compensate for the vulnerability of the sensitive features to damage. The sensitive areas can be deemed restricted, "keep out" areas for designated wheel rim or tire features that may be sensitive, and the non-sensitive areas can be deemed safe or acceptable, "keep in" areas for the designated features of the tire or rim. The machine controls can be configured, as explained below, to ensure that problematic positional conflicts are avoided by keeping the designated wheel rim and tire features away from the machine tools while the machine tools are operating in a tire change procedure. As such, designated sensitive features can be "kept in" a predetermined range of rotational positions, or alternatively "kept out" of a predetermined range of rotational positions as tire change procedures are executed, and thereby ensure that positional conflicts will not occur.

While exemplary routines addressing the presence of certain features that may be sensitive and highly prone to being damaged in a positional conflict, of which a TPMS sensor is one example, are possible using tactile force feedback as described above, they are by no means the only way that such issues could be addressed using exemplary control systems such as those described above.

For example, and as previously noted, in the exemplary control system 170 shown in FIG. 3 a position sensor element 176 (also shown in FIG. 1c) is provided that generates feedback to the controller 152 regarding a wheel mount rotation position during operation of the machine 100. As such, and for example, the controller 152 may receive feedback indicating the degree of rotation of the wheel rim mount 174 by the drive assembly, which is driven by the drive motor 172. As also previously noted, in different embodiments the drive assembly 104 may include a center post or shaft provided with the wheel rim mount 174, or alternatively may include a rotating turntable or spindle with the wheel rim mount 174 provided as a component of the spindle. Regardless of the location of the wheel rim mount 174 the rotational position sensor 176 provides a feedback signal indicative of a rotational position as the drive assembly 104 (FIG. 1) as it rotates the wheel rim 106 and associated tire 108 (also shown in FIG. 1). Accordingly, the controller 152 may be responsive to such a feedback signal to determine a positional conflict between one of the tools provided on the machine 100 to engage the tire 108 in a tire change procedure (e.g., one of the bead breaker tools 116) and certain features associated with the wheel rim or tire that may be sensitive. This may be accomplished using rotational position and tracking control as further described below.

Figure 11:
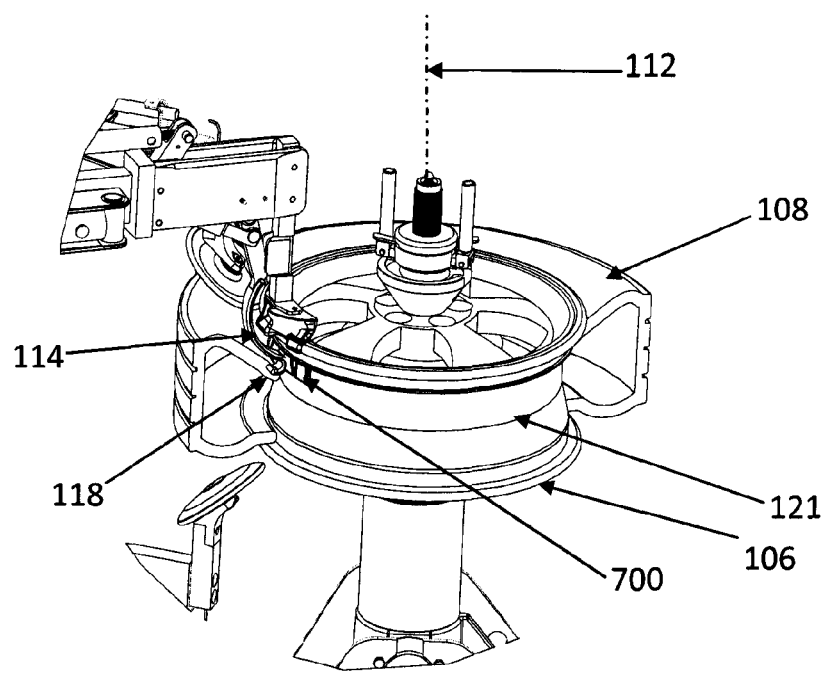
FIG. 11 is a partial perspective view of the machine with the tire partly broken away and showing an exemplary tire de-mount positional conflict.
Figure 12:
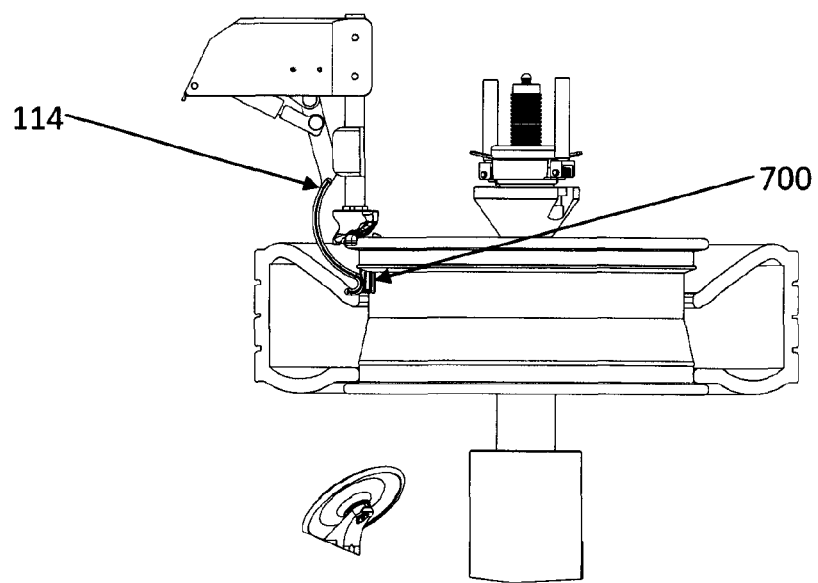
FIG. 12 is a partial side elevational view of the machine in the position shown in FIG. 11.

FIGS. 11 and 12 illustrate exemplary positional conflicts between a machine tool and a sensitive feature associated with a tire 108 and rim 106. More specifically, FIGS. 11 and 12 show a tire de-mount procedure in progress with the tire mount or demount tool 114 engaging the tire bead 118 in the drop center 121 of the rim. The rim 106 includes a sensitive feature such as a TPMS sensor 700 located proximate the tire valve stem (not shown in FIG. 11) that could be damaged if the tool 114 applies sufficient force to it (either via direct contact or indirectly through forces applied to the tire bead 118 that impact the TPMS sensor 700). While the TPMS sensor 700 as shown is affixed to the rim 106, in another embodiment it could alternatively be affixed to the tire 108. Moreover, wheel sensors other than TPMS sensors may be present, as may other sensitive features that are not necessarily sensors that present positional conflicts with the machine tools in use.

FIG. 12 illustrates a collision between the tool 114 and the TPMS sensor 700 that would result if the tire and rim were to continue to rotate without adjusting the position of the tool 114.

Figure 13:
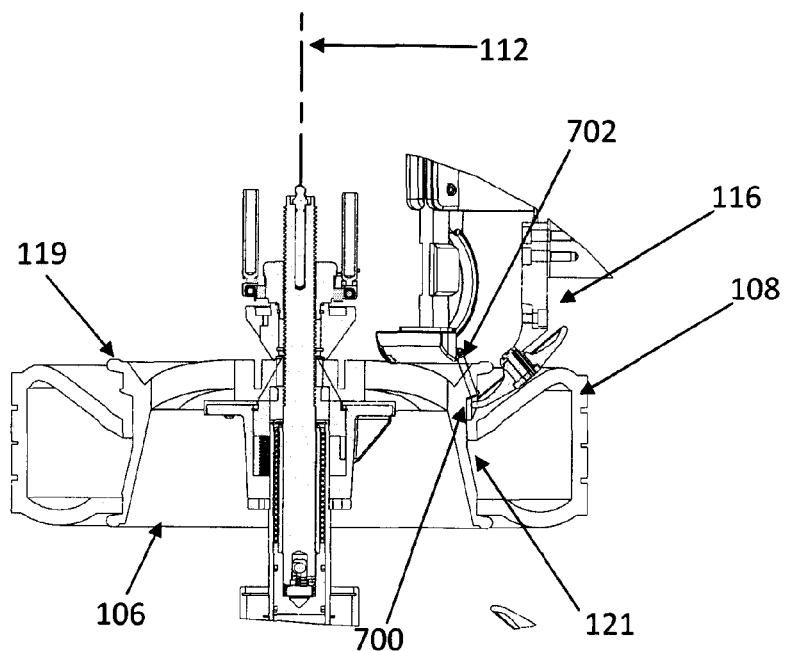
FIG. 13 is a view similar to the view shown in FIG. 12 but illustrating another machine tool engaged to the tire and presenting a positional conflict.

FIG. 13 is a view similar to the view shown in FIG. 12 but illustrating the bead breaker tool 116 engaged to the tire bead 118 in a tire mount procedure. As shown in FIG. 13, a collision between the bead breaker tool 116 and the TPMS sensor 700 would result if the tire and rim were to continue to rotate without adjusting the position of the bead breaker tool 116. While tire mount and de-mount positional conflicts are illustrated in FIGS. 11-13, it is understood that similar positional conflicts may be presented in other tire change procedures such as bead breaking procedures and other procedures described above. As used herein a "positional conflict" may exist via the use of tools within a certain spatial distance of designated features that may be sensitive, or via flexing and moving of the tire under influence of the tools that may result in designated features being negatively impacted. As such, and as will be explained further below, a tool can be located well away from a designated feature in use and while still presenting a positional conflict because of the reaction of the tire at some distance away from the tool. As such, a portion of the tire (e.g., the tire bead) may collide with the designated feature, such as a TPMS sensor even though the tool itself acting on the tire could not possibly strike the designated feature itself.

Potential collisions posed by positional conflicts, whether between the machine tools and sensitive features such as the TPMS sensor 700 or between the tire and a sensitive feature such as a TPMS sensor, regardless of the particular tire change procedure being executed with the machine 100, are undesirable and should be avoided. Even skillful machine operators, however, are prone to occasional mistakes that could damage the TPMS sensor 700 or other designated feature that may be sensitive. Such mistakes can be costly, and bearing in mind that a good deal of variety of tires and rims for vehicles are now in widespread use, manual avoidance of such positional conflicts across a variety of rims and tires presents practical challenges and limitations to human operators.

Figures 14A, 14B:
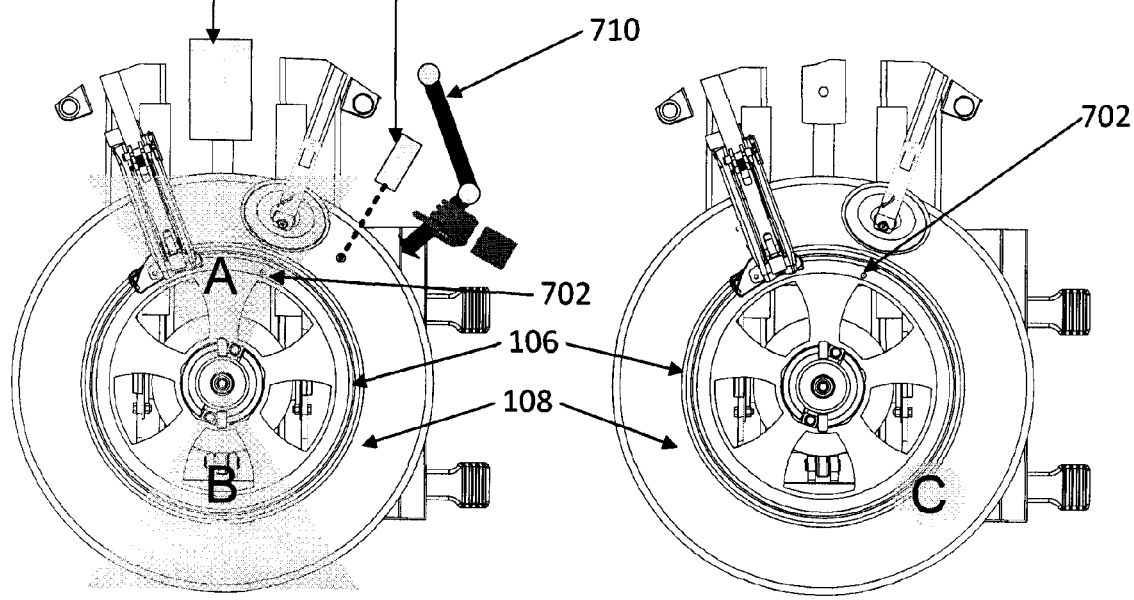
FIGS. 14a and 14b are top views of the machine with a tire and wheel rim and illustrating exemplary features of the rotational position and tracking control that avoids a positional conflict in a tire demount procedure and a tire mount procedure, respectively.

FIG. 14*a* is a top view of the machine 100 with a tire and rim mounted thereon and illustrating features of the rotational position and tracking control that avoids positional conflicts with designated tire and/or wheel rim features. Via rotational position sensing and tracking, the controls of the machine may effectively compensate for the presence of sensitive features and automatically compensate one or more aspects of the machine operation to avoid positional conflicts or minimize their consequences while the machine 100 operates.

FIG. 14*a* illustrates an exemplary control scheme to prevent a positional conflict with a TPMS sensor as the machine operates.

As shown in FIG. 14, the tire 108 includes a valve stem 702 that is typically aligned with or proximate to the location of known TPMS sensors 700 (FIGS. 11-13). Thus the location of the valve stem 702 defines a first sensitive feature and corresponding sensitive area thereabout that is represented by the zone or region A. A TPMS sensor, if present, is likely to be located in the zone or region A, and as such the region A may be defined to be larger than only the valve stem itself would otherwise require. The size of the zone A may vary in different embodiments, but in general the zone A represents a range of rotational positions that is large enough to render any direct collision between a machine tool and a designated feature of the wheel rim and/or tire physically impossible, as well as to ensure that any direct collision between a portion of the tire (e.g., the tire bead) and the designated feature (e.g., a TMPS sensor) is avoided as the tire is flexed or influenced by a tool acting on a portion of the tire at a distance from the designated feature. It is contemplated that the zone A may vary for different types of tires and wheel rim combinations, and an appropriate Zone A can be empirically determined, calculated based on attributes of the wheel rim and tire, or pre-set to encompass a wide variety of wheel rims and tires without impeding the ability of the machine to complete tire change procedures. Zone A can be thought of as a "keep out" area for the TPMS sensor while one or more of the machine tools are operating near the wheel rim in a tire change procedure (e.g., when the machine tools are at a location beneath the upper rim lip and radially or horizontally close to the wheel rim).

Because TPMS sensors are sometimes installed in a position about 180° from the valve stem 702, a second region or zone B is defined as a second sensitive area in the example shown. Zone B also represents a range of rotational position that is sufficiently large to render any direct collision between a machine tool and a designated feature of the wheel rim and/or tire physically impossible, as well as to ensure that any direct collision between a portion of the tire (e.g., the tire bead) and the designated feature (e.g., a TMPS sensor) is avoided as the tire is flexed or influenced by a tool acting on a portion of the tire at a distance from the designated feature. The zones A and B, which may be the same or different sizes in different embodiments, essentially define arcuate portions of the wheel rim and tire that can be monitored and tracked during machine operation as the tire is rotated to avoid positional conflicts.

In another embodiment, instead of zone B representing a second "keep-out" zone for a second feature that may be present, zone B can be thought of as a second keep out area for the same TPMS sensor referenced in zone A, and the zones A and B represent the TPMS sensor being rotated through different rotational positions at different times as a tire is changed. Thus, for example, zone A may be deemed a first "keep out" area for a designated features such as a TPMS sensor that is applicable when the machine tools are used to press the tire, while zone B defines a second "keep out" area that is applicable when the machine tools are used to lift the tire. In such an example, at any given time during operation of the machine, the control scheme applies one of the other, but not both, of the zones A and B. Zone A serves to avoid positional conflicts in the operating area of the machine tools, while Zone B defines a "keep out" area while the upper and lower tire beads are being lifted by the machine tools (during demount) to ensure that the TPMS sensor is not damaged by positional conflicts from either of the upper and lower tire beads sliding up the wheel rim as the tire is lifted.

While two regions A and B are shown in FIG. 14A, greater or fewer zones or regions are possible in alternative embodiments. For example, if the TPMS sensor is known to reside in one of the zones A or B for a given wheel rim or tire, only the corresponding zone A or B need be used while still avoiding positional conflicts to some extent. In an embodiment wherein the TPMS sensor is located in zone B, but not zone A, the zones A and B as described above may be effectively reversed for control purposes. Likewise, additional zones may be employed for still other possible locations of TPMS sensors, or for other features such as wheel spokes and automatic tire inflation components or mechanisms whose locations can be known or inferred from the valve stem 702 or by other techniques disclosed herein or in the related applications that have been incorporated by reference.

The regions A and B shown in the example of FIG. 14*a* may be deemed from a controls perspective to be restricted or "keep-out" areas in which the machine tools should not be operated in as the wheel rim and tire is rotated during a tire demount procedure, or alternatively as "keep-out" areas that the designated sensitive features should not be rotated through while the machine tools are operating. Alternatively, the remaining regions or zones of the tire not encompassed by the regions A or B, may be deemed safe or "keep-in" areas in which the machine tools should be operated in as the wheel rim and tire is rotated in a tire change procedure, or wherein a designated sensitive feature should be kept while the machine tools are operation. It is understood that whether the control system is configured in a positive way to keep the machine tools or the sensitive features in the "safe" areas or in a negative way to keep the machine tools or sensitive features out of "unsafe" areas, functionally equivalent systems would result. As the zones A or B in the example shown are rotated through the tool working area on the machine, the tools can be disengaged to avoid positional conflicts, and as the regions other than zones A or B are passed through the tool working area on the machine, the tools can be engaged without posing positional conflicts. Alternatively, by tracking the rotational position of the valve stem zone A or B, for example, the machine controller can ensure that the valve stem 702 (or potentially a TPMS sensor located about 180° away from it) is never rotated through the machine tool working area wherein a possible positional conflict with one of the tools 114 or 116 can arise.

By making the location of the valve stem 702 known to the machine 100 in the example of FIG. 14*a*, and especially to its controller 152 (FIG. 3) in one example, the controller 152 can automatically operate the machine components, including but not limited to the tools 114 and 116 to avoid positional conflicts with sensitive features in either of the zones A or B. Of course, and as mentioned above, additional or different features may be presented on the tire and/or rim in other locations and be designated for control purposes to define a sensitive zone or region in further and/or alternative embodiments, with the controls adapting accordingly as explained below.

An initial location of the valve stem 702, or other features from which appropriate control zones or regions may be derived, can be entered, accepted, or otherwise made known to the machine in a variety of ways. For example, a machine vision component 706 may be provided to automatically detect or determine an initial position or reference point of the valve stem 702 or other designated features.

In another embodiment a reference point locator element 708 such as a laser element may be provided to cast a reference indicia such as a point, line, or other visual indicator over the tire 108 that the human operator could then use to align the sensitive feature such as the valve stem 702 with the reference indicia. Once aligned, the operator could manipulate an input selector on the machine so that the location is recorded in machine memory, which then serves as a reference input for the machine controls to define or apply applicable zones such as A and B and track designated features as they are rotated in a tire change procedure.

As another example, a dataset arm 710 could be provided and utilized by the human operator to identify the location of a sensitive feature such as the valve stem 702, which then serves as reference point for the machine controls. In yet another embodiment, the tire may be rotated during an initialization routine while force is monitored to determine and record the location of one or more reference points corresponding to sensitive features. Of course, still other variations are possible to identify a starting position or reference point of a designated feature to the machine controller so that its rotational position can thereafter be monitored and tracked for machine control purposes.

It is also noted that a feature or reference point other than the sensitive feature itself could be utilized with a reference line or other indicia in other embodiments, as long as the location of the sensitive feature or features of the tire and rim could be derived from the reference point utilized. For example, a dot or another symbol applied to one or both of the tire and rim could provide a basis for the machine to deduce or otherwise determine the location of sensitive features as long as a relationship between the position of the dot or symbol and the location of the tire sensitive features was known. In different embodiments, such reference points may or may not physically line up with the sensitive features themselves, and multiple and different types of dots and symbols could indicate different sensitive features or different locations of features. Multiple colors of dots or other graphic symbols could likewise be provided with varying degrees of sophistication to identify a number, type, and locations of sensitive features across various possible tire and rim combinations, as well as to identify tire and rim sizes and other information of interest to the machine controls. Various other alphanumeric coding schemes are likewise possible in addition to or in lieu of color coded graphic schemes.

In still further embodiments, the tire and/or rim could be provided with bar codes, RFID tags and the like that could be read by the machine or the machine could otherwise be provided with information that is accepted to the machine for purposes of identifying the location, and possibly type as well, of sensitive features.

Once the location of designated feature(s) such as the valve stem 702 is known as an initial matter, by monitoring the rotational position of the feature 702 thereafter the machine controller can determine positional conflicts as the machine is operated and take corrective correction automatically, without human intervention, to avoid problematic positional conflicts. Such corrective action may include one or more of the following adjustments in operation of the machine: slowing a speed of rotation of the drive assembly; ceasing rotation of the drive assembly completely; adjusting a position of machine tools presenting conflicts; adjusting an amount of force applied with the tools; and releasing all force generated by the machine on the tire. Likewise, indicator and alarm features 164 and 168 (FIG. 3) and graphic displays and visual feedback may be presented to human operators via the machine display 124 (FIG. 3) to alert them of problematic operating conditions, provide status or guidance concerning proper machine operation, or to prompt corrective action needed to be taken by the operator.

FIG. 14b illustrates the machine in a similar view to FIG. 14A, but illustrates a tire mount procedure. Continuing with the example of a sensitive feature such as the valve stem 702, the control considerations are not exactly the same as for the demount procedure shown in FIG. 14A. In the mount procedure, the tire bead is pressed over the lip of the wheel rim, rather than being pulled above the wheel rim lip as in the demounting procedure. The tire demount procedure, because the tools are acting in an opposite manner to the mounting procedure, therefore presents different positional conflict issues. In particular, a risk of a portion of the tire bead striking a TPMS sensor, for example, at a distance away from the tool 116 is of greater concern during the mounting procedure. Accordingly, and as shown in FIG. 14b, the valve stem 702 is moved to an initial or start position, designated by the region C in FIG. 14B that is spaced from the tool 116 by a sufficient amount to minimize this positional conflict presented by the tire as it is initially pressed over the wheel rim lip.

Once its location is known the machine controller can locate the valve stem 702 (or other designated feature) to distinct start positions for tire mount and de-mount procedures, for example, and further reduce any likelihood of a positional conflict during the procedure. Different and unique start positions are possible depending on which features are designated, and may vary with different tire change procedures as desired. That is, different starting positions may be adopted for tire mount, tire demount, bead breaking or other procedures performed with the machine.

Figure 15:
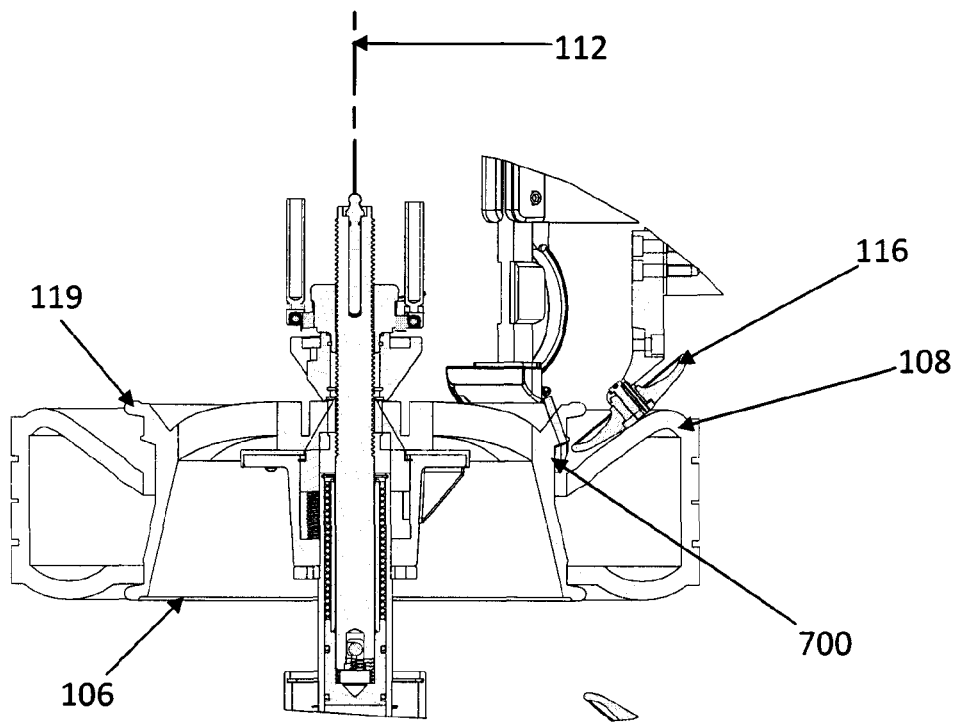
FIG. 15 is a side elevational view of similar to FIG. 13 but showing adjustment of the tool to avoid the positional conflict.
Figure 16:
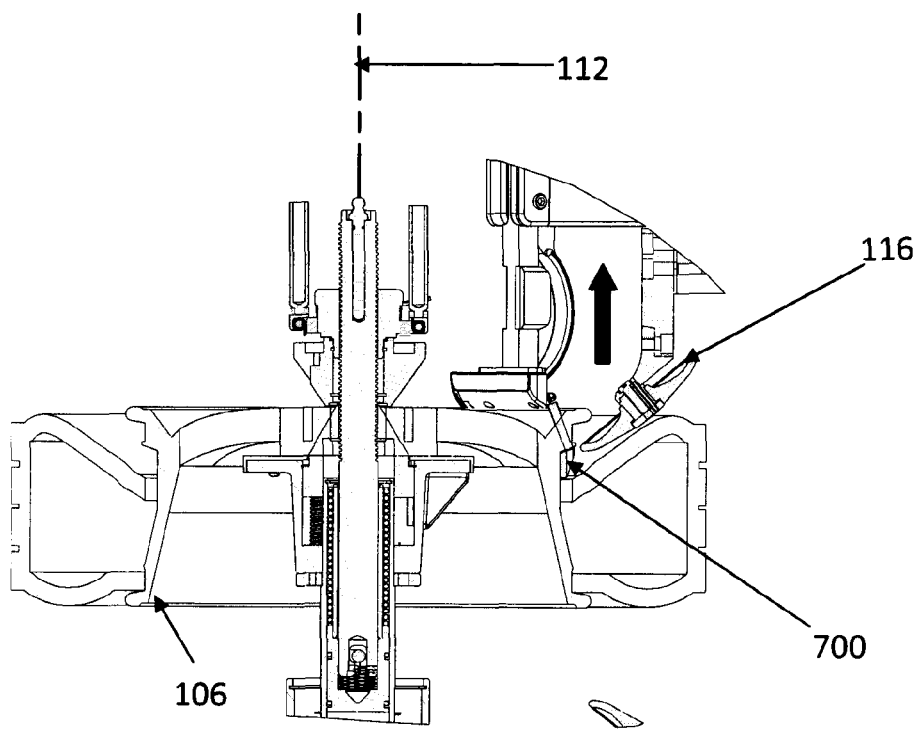
FIG. 16 shows further adjustment of the tool shown in FIG. 15 to avoid the positional conflict.

FIG. 15 is a side elevational view of the machine showing positional adjustment of the bead breaker tool 116 to avoid a collision with the TPMS sensor 700. Comparing FIGS. 13 and 15, it is seen that the bead breaker tool 116 has been moved by the controller 152 in a direction that is radially outwardly and away from the location of the TPMS sensors 700, thereby providing some lateral clearance to avoid direct contact between the bead breaker tool 116 and the TPMS sensor 700. FIG. 16 shows further adjustment of the bead breaker tool 116 wherein the bead breaker tool 116 has been moved by the controller 152 in a direction parallel to the drive axis 112 vertically away from the location of the TPMS sensor 700 on the rim 106, thereby providing some longitudinal clearance to avoid direct contact between the bead breaker tool 116 and the TPMS sensor 700.

Figure 17:
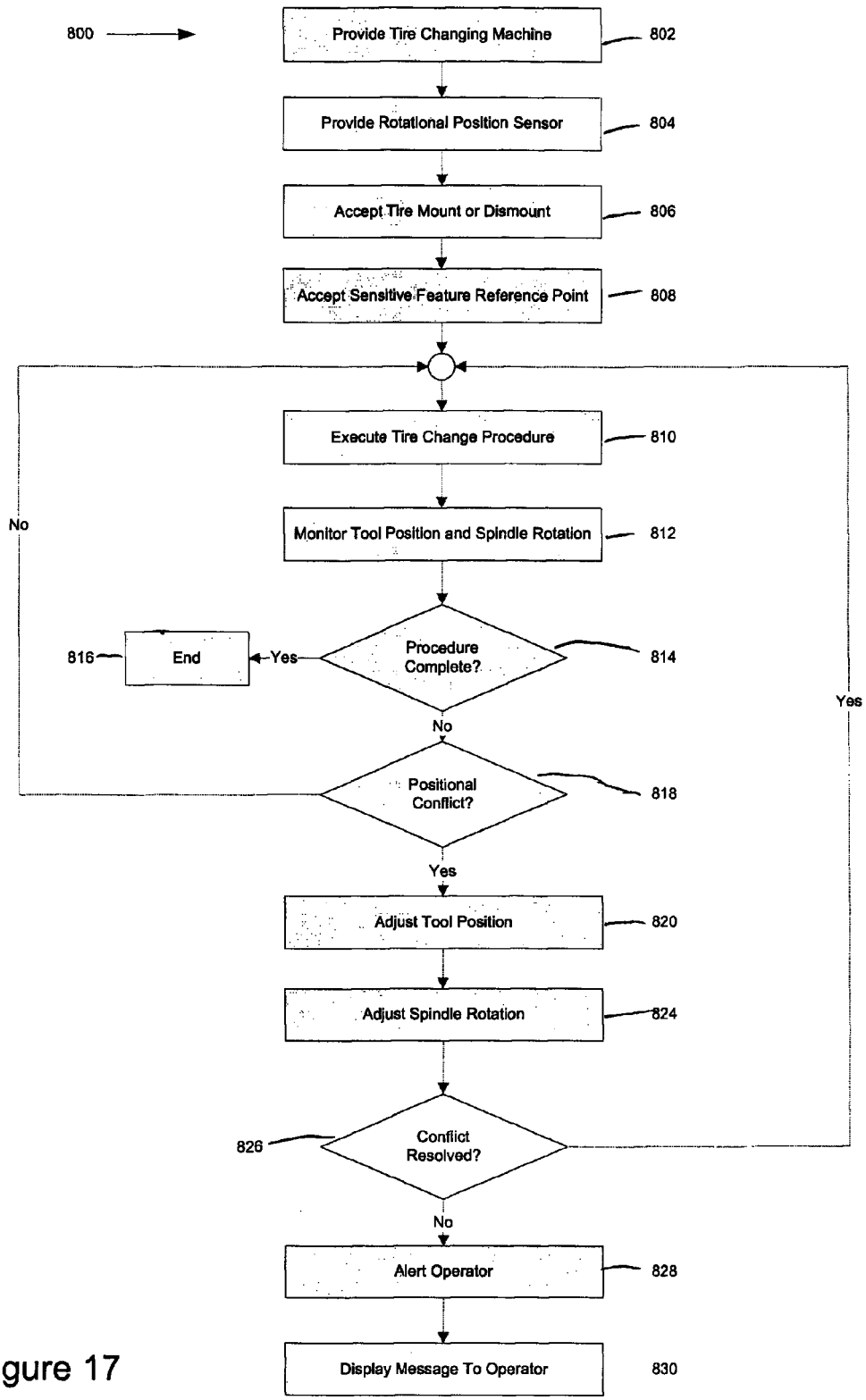
FIG. 17 is a method flowchart illustrating exemplary processes associated with the rotational position and tracking control.

FIG. 17 is a method flowchart illustrating exemplary processes 800 associated with the rotational position and tracking control and used with the machine 100, for example.

As shown in FIG. 17, the method includes the preliminary steps 802 and 804 of providing the machine and providing the rotational position sensor. It is understood that rotational position sensor is to be interfaced with the machine controls, such as the controller 152 shown in FIG. 3 in one example. As such, the rotational position sensor provides a signal to the controller regarding a rotational position of the tire and rim as a tire change procedure is executed. As previously mentioned, the rotational position sensor may be coupled to a wheel rim mount coupling the wheel rim to the machine drive assembly, although the sensor may alternatively be located elsewhere if desired.

Also, it is assumed for purposes of the method 800 that a wheel rim and tire has been properly mounted on the machine, although the step of mounting the wheel rim and associated tire is not shown.

At step 806, the machine, and more specifically the controller, accepts a tire mount mode or de-mount selection from the machine operator. That is, the human operator makes a selection regarding the type of procedure that the operator intends to execute. The selection of the tire-mount mode or de-mount mode may be made in any manner in the art, including but not limited to the use of a button, switch, level, pedal, keyboard, mouse, touch sensitive display screen, or other input selector known in the art.

At step 808, the machine, and more specifically the controller, accepts one or more sensitive feature reference points so that the rotational position locations of the sensitive features become known to the controller. Various techniques for detecting or accepting such reference points are described above or in the related applications referenced above, any of which may be used. After step 808, the machine is initialized and ready for use.

At step 810 the controller begins to execute the tire mount or dismount procedure accepted at step 806 and moves the wheel rim and associated tire so that the sensitive feature is located at the respective start position for the selected mode at step 806. As described above, the start position for the tire mount mode and tire de-mount mode may be different from one another. The different start positions may be considered optional in some embodiments, however.

Execution of the tire change procedure as shown at step 810 may be accomplished in a fully automatic manner (i.e., without requiring any participation of the operator after it starts), in a fully manual manner (i.e., fully reliant upon the operator for actuation of the components), or in a partly manual and partly automatic manner including some participation by the machine operator in certain aspects and fully automatic action in other aspects. Thus, varying degrees of machine sophistication can be provided to suit different needs and preferences. In accordance with exemplary embodiments described above, one or more of the machine tools may be automatically positionable by the controller to engage the tire.

At step 812, while the tire change procedure is executed, the controller monitors the position of the tools involved and the rotational position of the wheel rim and associated tire, and specifically the rotational position of the sensitive feature(s) identified to the machine at step 808, as the drive assembly is actuated to rotate the wheel rim and associated tire in a tire change procedure, and as the machine tools are engaged to the wheel rim and tire.

The tire change procedure commenced at step 810 is monitored as shown at step 812 throughout the procedure. As such, the controller determines as shown at step 814 whether or not the procedure has been completed. If the procedure has been completed, the algorithm ends at step 816 and the controller reverts back to a main control loop.

As long as the procedure is not complete, and as shown at step 818, positional conflicts between any of the machine tools and sensitive features input at step 808 are evaluated. Because tool position and the rotational position of the sensitive feature are being monitored during the tire change procedure as shown at step 812, a positional conflict between the sensitive feature and one or more of the machine tools can be determined. The determination of a positional conflict can be made in real time by comparing the rotational positions of the sensitive feature with the positions of the tools during the tire change procedure, or in advance before the tire change procedure is executed. Specific tire change procedure routines can be provided that reflect positional conflict determination during the procedure. If no positional conflict is determined to be present, the tire change procedure continues to be executed at step 810 until complete at step 814.

As shown at steps 820 and 824, if a positional conflict has been determined the controller can adjust the positions of the tools and/or adjust rotation of the wheel rim and associated tire to avoid positional conflicts between the sensitive feature and the machine tools. Various adjustments of tool position and adjustment of the drive assembly are described above, any of which may be used. In a manually operated tire change procedure, the controller may override the operator selected positions and actuation of the drive assembly in response to positional conflicts. Thus, for example, the machine may suspend operation in the event that a positional conflict and collision becomes imminent as the operator utilizes the machine. Alternatively, the machine may allow the procedure to continue the procedure with appropriate adjustment of the machine tools, which may be automatically undertaken by the machine controller.

After adjustment are made at steps 820 and 824, the controller determines whether the conflict is resolved at step 826. That is, the controller determines whether or not the conflict remains, or has been avoided or mitigated via the adjustments at steps 820 and 824. If the conflict has been resolved at step 826, the controller continues to execute the procedure the tire change procedure at step 810.

If a positional conflict has been determined but not resolved via steps 822 and 824, an operator may be alerted and/or a message displayed to the operator as shown at steps 828 and 830. Any of the alert or display features described may be utilized. Steps 828 and 830 may be considered optional in some embodiments.

Figure 18:
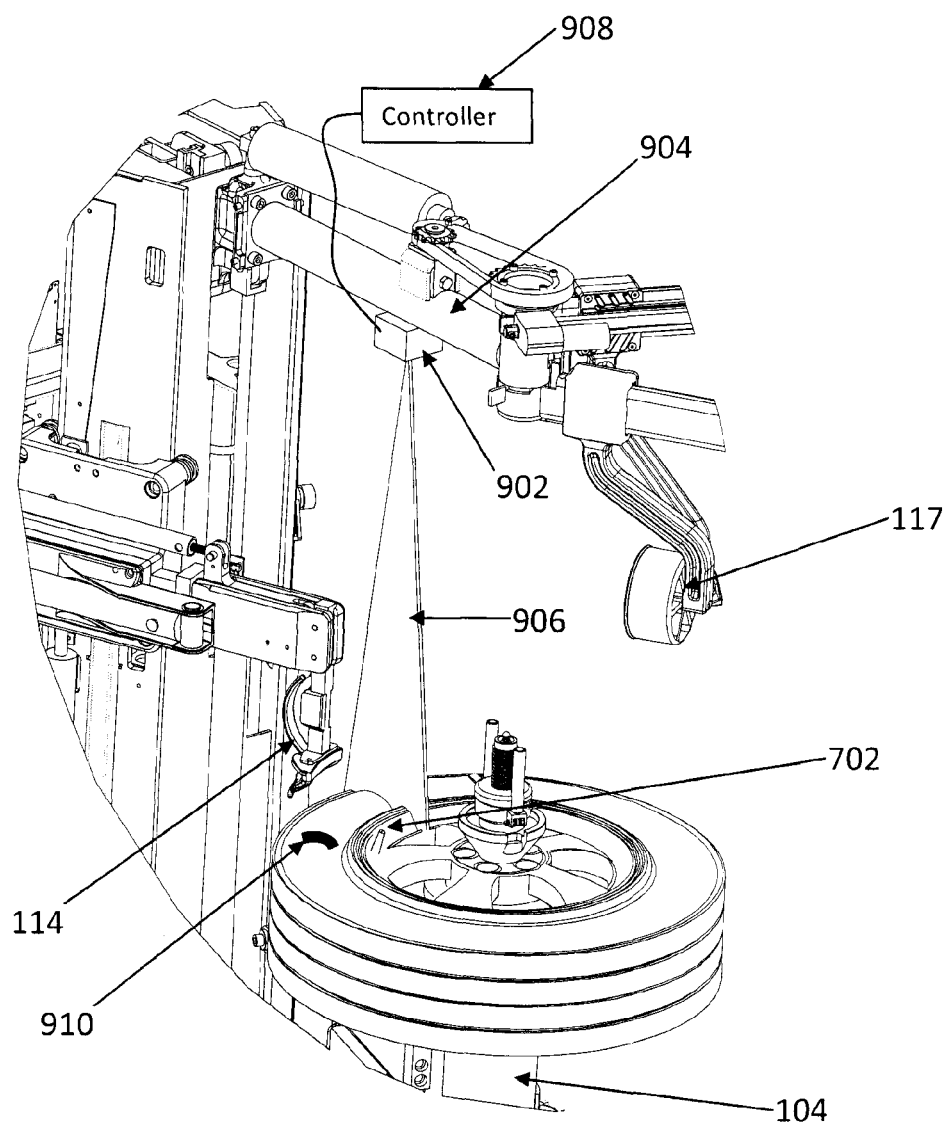
FIG. 18 is a partial perspective view of another embodiment of a tire changing machine.

FIG. 18 illustrates another embodiment of a tire changing machine 900 that beneficially detects a rotational position of a sensitive feature and compensates machine operation accordingly to prevent problematic positional conflicts. Like features of the machine 900 and the machine 100 are indicated with like reference characters. Unlike the foregoing embodiments, the machine 900 accomplishes rotational position and tracking controls without utilizing a rotational position sensor coupled to the machine drive assembly.

Rather, as shown in FIG. 18, the machine 900 includes a machine vision system 902. In the example shown in FIG. 18, the machine vision system 902 is mounted to a machine support arm 904 and is generally positioned above the rim 106, the tire 108 and the tool working area of the machine. The vision system 902, in according with known machine vision techniques, includes a camera that scans a zone 906 including an area of the tire 108 and rim 106. Via continuous scanning of the zone 906, the vision system 902 can "see" the tire and rim in use. The machine vision system 902 provides an input signal to a controller 908 that is, in turn, operatively connected to the various actuators of the machine in a control network. As such, the controller 908, similar to the controllers discussed above, can adjust various operating aspects of the machine 900, including operation of the drive assembly 104 and the various tools 114, 116 and 117 provided on the machine. The controller 908 may therefore adjust one of more the machine actuators in a fully automatic manner to avoid positional conflicts and associated issues with sensitive tire and rim features. Additionally, or alternatively, the controller 908 may provide alarms, alerts and informational displays similar to those described above when positional conflicts are presented, and prompt a human operator to take corrective action.

By virtue of the vision system 902, the machine 900 or more specifically a machine controller 908, can monitor and track a rotational position of, for example, the tire valve stem 702. As described above, sensitive features such as TPMS sensors are often located near the valve stem 702, and valve stem 702 can therefore be considered a reliable reference point for locating sensitive features. When the valve stem reference point enters the field of view of the machine system 902, this reference point is accepted by the machine controller 908 which therefore may act in accordance with the methodology described above.

More specifically, as the tire 108 and rim 106 are rotated in a tire change procedure, when the valve stem 702 approaches a machine tool, such as the tool 114, the valve stem 702 enters the field of view of the vision system 102. As the vision system 902 "sees" or detects a presence of the valve stem 702 approaching the tool 114, it sends a signal to the controller 908. When the controller accepts the signal, the controller 908 accordingly may respond adjust a position of the tool 114 and/or other operation of the machine 900 to avoid a positional conflict. Any of the corrective actions described above may be undertaken by the controller 900.

In another embodiment, the machine vision system 902 may see a sensitive tire features itself, such as a TPMS sensor, as the machine is used. Thus, as the sensitive feature is rotated toward a machine tool the controller 902 may take appropriate action to avoid a positional conflict. In such embodiments, a TPMS sensor or other sensitive feature may be a self-identifying reference point that the controller 902 accepts as it comes into view in order to control the machine 100 using the above-described methodology.

It is possible that in certain situations the vision system 902 may not be able to see a tire valve stem 702 and/or a TPMS sensor or other sensitive feature. In such a situation a visible mark 910 can be placed on the tire 108, for example, by a person such as a technician to indicate a proxy reference point for a sensitive feature that the machine may accordingly recognize. In various embodiments, the visual mark 910 may be a chalk mark, a crayon mark, a sticker, or other indicia capable of being visually detected by the vision system 902. When the vision system 902 sees and accepts the visual mark 910 coming near the tool 114, for example, vision system 902 signals the controller 908 accordingly. The controller 908 can adjust the tool position to avoid positional conflicts as the signals from the vision system 902 are accepted. It is possible that items other than valve stem locations or TPMS sensor locations may be similarly marked, such as wheel weights or other items, that would be desirable for the machine 900 to avoid in a tire change procedure.

Figure 19:
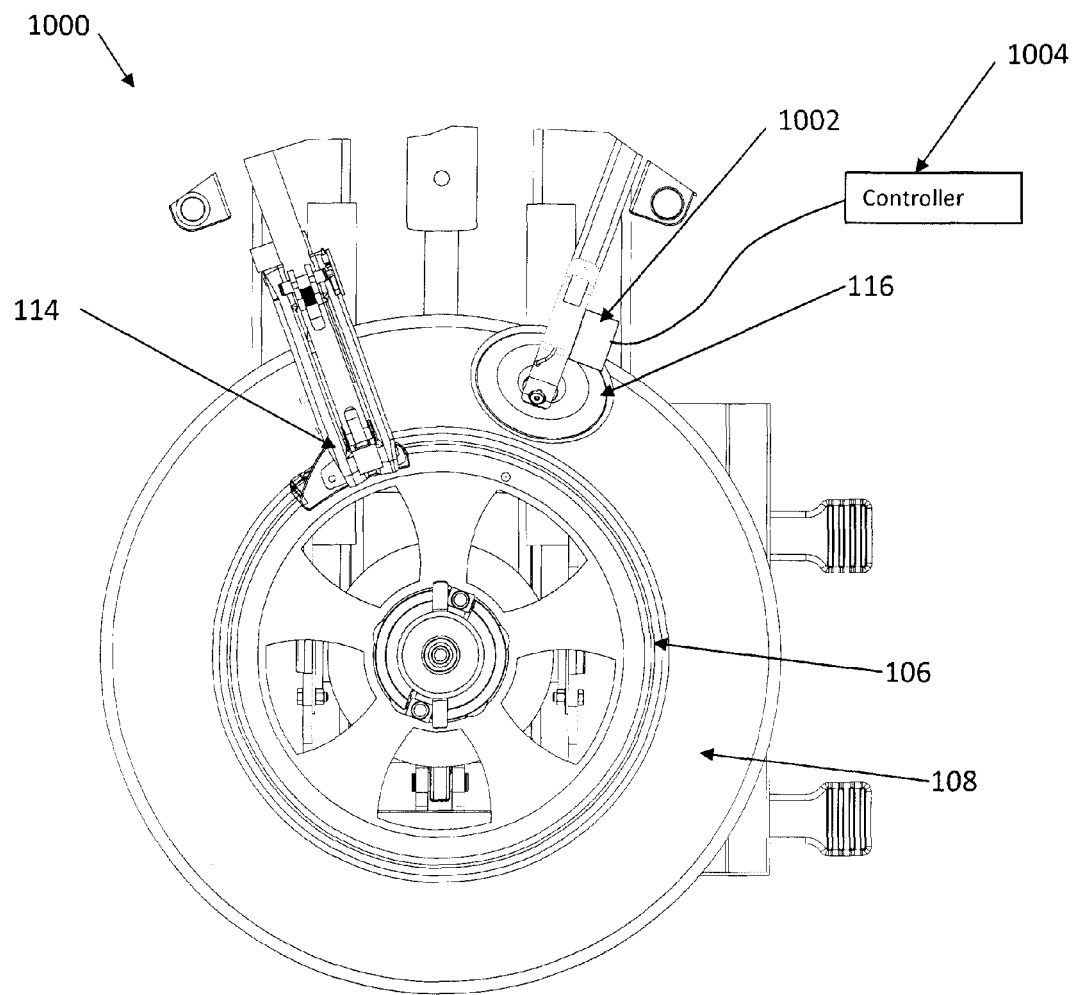
FIG. 19 is a top elevational view of still another embodiment of a tire changing machine.

FIG. 19 illustrates another embodiment of a tire changing machine 1000 including a sensitive feature detector element 1002, sometimes referred to as a reader, integrated with a tool assembly. In the example shown, the reader 1002 is coupled to the tool 116, although it may alternatively be provided with other tools if desired. The reader 1002 may detect, for example, a presence of a TPMS sensor and provide corresponding inputs to a controller 1004 that is configured to execute the methodology described above. Exemplary reader or detector elements 1002 capable of detecting TPMS sensors are known and described, for example, in U.S. Pat. Nos. 6,904,796 and 7,404,427. Other reader or detector elements, however, may likewise be utilized in other embodiments as desired.

Regardless of the how the sensitive feature such as a TPMS sensor is detected, when the reader 1002 senses that the TPMS sensor, for example, is approaching the tool 116, it inputs a signal to the controller 1004. When the signal is accepted by the controller 1004 it may adjust one or more operating aspects of the machine, including but not limited to adjusting position of the tool 116, to avoid a positional conflict.

It is contemplated that more than one of the reference input features described may be combined in a single machine to provide redundant, fail safe features. That is, a rotational sensor may be provided in addition to a machine vision system and/or a reader or detector element, and the machine controllers may compare reference inputs provided by one of the input elements against the feedback of other of the input elements. It is further contemplated that a machine operator may in such embodiments selectively choose which of the input options to utilize for a given tire change procedure. Alternatively, the machine may intelligently choose between the available input options, and when executing different options the machine controller may use different ones of, or different combinations of, the reference input elements (e.g., rotational position sensors, machine vision systems, and reader or detector elements) when executing different tire change procedures. Varying digress of machine and control sophistication may therefore be provided to meet particular needs.

The rotational position and tracking methodology as described may also be combined with other machine features and methods disclosed. For example, instead of being used as a stand alone control feature, the rotational position and tracking may be used in combination with the disclosed force feedback methodology to provide redundant, fail-safe operation of the machine if desired. Further, rotational position and tracking, and also force feedback operation, may be provided as options that may be turned on or off by a user as desired or as needed. As such, if a particular wheel rim and tire is known to not include a sensitive feature, such as a TPMS sensor, the rotational position and tracking controls may be desirably disabled. It is also understood that the haptic systems and other features disclosed may be desirably used in combination with the rotational position and tracking control.

Having now described the control systems and exemplary algorithms, routines and processes in relation to FIGS. 1-19, it is believed that those of ordinary skill in the art could program the controllers without further explanation to provide the functionality described. That is, it is believed that those in the art could implement the methods and algorithms described above in appropriate controllers without further explanation.

The benefits of the invention are believed to be amply illustrated by the various embodiments disclosed.

An exemplary embodiment of a tire changing machine for changing a tire on a wheel rim has been disclosed. The machine comprises: a base; a drive assembly coupled to the base and configured to rotate a wheel rim and associated tire about a rotational axis; at least one tool configured to engage the tire in a tire change procedure; a rotational position sensor providing a signal indicative of a rotational position as the drive assembly rotates the wheel rim and associated tire; and a controller responsive to said signal to monitor a rotational position of at least one designated feature of the wheel rim or tire during a tire change procedure.

Optionally, the designated feature may be a sensitive feature, and the reference position may be monitored to avoid a positional conflict with the sensitive feature. The drive assembly may be a rotating spindle, and the position sensor may be a component of the spindle. The at least one designated feature may be one of a tire pressure monitoring system (TPMS) sensor and a valve stem.

The controller may be further configured to accept at least one reference input corresponding to the designated feature, and to monitor a rotational position of the reference input during a tire change procedure. The at least one reference input may be automatically determined by the controller. The machine may include at least one machine vision component, with the machine vision component determining the at least one reference input. Alternatively, the machine may include a reference point locator, with the reference point locator feature determining an initial location of the reference input when the at least one designated feature is aligned with the reference point locator. The reference point locator may be one of a laser indicator or a dataset arm.

The machine may include at least one force sensor associated with the at least one tool, and the controller may be configured to: engage the at least one tool to the tire; rotate the drive axis while monitoring a signal of the rotational position sensor; and monitor a force signal from the at least one force sensor to determine the at least one reference point corresponding to a sensitive feature associated with the wheel rim or tire. The at least one tool may be a bead breaker tool. The controller may be configured to, while the wheel rim and tire are rotated about the drive axis in a tire change procedure, adjust a position of the at least one tool as the at least one designated feature is rotated proximate the tool, thereby avoiding a positional conflict with the designated feature. The tire change procedure may be one of a bead breaking procedure, a tire mounting procedure, and a tire de-mounting procedure.

The machine controller may alternatively be configured to, while the wheel rim and tire are rotated about the drive axis in a tire change procedure, adjust operation of the drive assembly as the at least one designated feature is rotated proximate the tool, thereby avoiding a positional conflict with the designated feature. The controller may be configured to stop or reverse the operation of the drive assembly to avoid a positional conflict with the designated feature.

The controller may further be configured to alert an operator of a positional conflict with the designated feature. The machine may include a display, and the controller may be configured to display a message to an operator.

The at least one tool may be automatically positionable by the controller to engage the tire, with the controller configured to initially adjust a relative position of the at least one designated feature and the at least one tool to perform a tire change procedure with a reduced likelihood of a positional conflict. The tire change procedure may be one of a tire mount procedure and a tire demount procedure. An initial position of the at least one tool and the at least one designated feature may be different in the respective tire mount and de-mount procedures.

The controller may be further adapted to apply at least one of a keep out zone or a keep in zone for one of the operation of one of the at least one tool and a rotational position of the designated feature.

A method of performing a tire change procedure with a tire changing machine has also been disclosed. The machine includes a base, a drive assembly coupled to the base and configured to rotate a wheel rim and associated tire about a rotational axis, at least one tool configured to engage the tire in a tire change procedure, a rotational position sensor providing a signal indicative of a rotational position as the drive assembly rotates the wheel rim and associated tire, and a controller responsive to said signal. The method is executable by the controller and includes: accepting a reference input corresponding to a designated feature associated with the wheel rim or tire; and operating the machine to avoid a positional conflict between the designated feature and one of a component of the machine and the tire as influenced by the machine.

Optionally, the designated feature is one of a tire pressure monitoring system (TPMS) sensor and a valve stem. The method may further include: using the reference input to determine the positional conflict, and adjusting operation of the machine to avoid the positional conflict. Accepting the reference input may include automatically determining, with the controller, the reference input. The machine may include a machine vision component, and accepting the reference input may include utilizing the machine vision component to determine the reference input.

Alternatively, the machine may include a reference point locator, and accepting the reference input may include utilizing the reference point locator to determine an initial location of the reference input. The method may include aligning the designated feature with the reference point locator. The reference point locator may be a laser indicator, and the method may include creating a reference indicia with the laser indicator. The reference point locator may be a dataset arm, and the method may include using the dataset arm to determine an initial location of the reference input.

The machine may further include at least one force sensor associated with the at least one tool, and the method may further include: engaging the at least one tool to the tire; rotating the drive axis while monitoring a signal of the rotational position sensor; and monitoring a force signal from the at least one force sensor to determine the at least one reference input, the reference input corresponding to the designated feature.

Operating the machine to avoid a positional conflict may include, while the wheel rim and tire are rotated about the drive axis in a tire change procedure, adjusting a position of the at least one tool as the at least one designated feature is rotated proximate the tool. The at least one tool may be a bead breaker tool. The tire change procedure may be one of a bead breaking procedure, a tire mounting procedure, and a tire de-mounting procedure.

Operating the machine to avoid a positional conflict may also include, while the wheel rim and tire are rotated about the drive axis in a tire change procedure, adjusting operation of the drive assembly as the at least one designated feature is rotated proximate the tool, thereby avoiding the positional conflict. Adjusting operation of the drive assembly may include stopping or reversing the operation of the drive assembly to avoid the positional conflict.

The method may further include alerting an operator of the positional conflict. The machine may include a display, and the method may include displaying a message to an operator.

The method may include initially adjusting a relative position of the at least one designated feature and the at least one tool to perform a tire change procedure with a reduced likelihood of the positional conflict.

The method may include accepting one of a tire mount mode and a tire de-mount mode for executing the procedure, and rotating the tire to a start position corresponding to the selected mode.

Accepting a reference input may include recalling the reference input from a database or data store.

Operating the machine to avoid a positional conflict may include, while the wheel rim and tire are rotated about the drive axis in a tire change procedure, applying at least one of a keep out zone and a keep in zone for one of the at least one tool and a rotational position of the designated feature, thereby avoiding the positional conflict.

Another embodiment of a tire changing machine for changing a tire on a wheel rim has also been disclosed. The machine includes: a base; a drive assembly coupled to the base and configured to rotate a wheel rim and associated tire about a rotational axis; at least one tool configured to engage the tire in a tire change procedure; a controller configured to accept a reference input corresponding to a location of at least one designated feature associated with the wheel rim or tire, and the controller further configured to adjust operation of the machine to avoid to a positional conflict with the designated feature.

The machine may optionally include a machine vision system, with the machine vision system communicating with the controller to provide the reference input. The machine may also include a TPMS detector, with the TPMS detector communicating with the controller to provide the reference input. The TPMS detector may be coupled to the at least one machine tool. The machine may include a rotational position sensor, with the rotational position sensor communicating with the controller to provide the reference input. The controller may be configured to apply one of a keep out zone or a keep in zone for operation of the at least one tool or a rotational position of the at least one designated feature to avoid the positional conflict.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire changer machine for changing a tire on a wheel rim, the machine comprising:
a base;
a drive assembly coupled to the base and configured to rotate the wheel rim and tire about a rotational axis;
at least one tool configured to engage the tire in a tire change procedure;
a rotational position sensor providing a signal indicative of a rotational position of the wheel rim and tire; and
a controller operatively coupled to the drive assembly and the at least one tool;
wherein the controller is configured to:
monitor the signal and a corresponding rotational position of at least one designated feature of the wheel rim or tire during a tire change procedure; and
while the wheel rim and tire are rotated about the rotational axis in the tire change procedure, adjust a position of the at least one tool in response to the rotational position of the at least one designated feature.

2. The tire changer machine of claim 1, wherein the drive assembly includes a rotating spindle, and the rotational position sensor is a component of the spindle.

3. The tire changer machine of claim 1, wherein the at least one designated feature is one of a tire pressure monitoring system (TPMS) sensor and a valve stem.

4. The tire changer machine of claim 1, wherein the controller is further configured to accept at least one reference input corresponding to the rotational position of the at least one designated feature, and thereafter monitor the rotational position of the reference input during the tire change procedure.

5. The tire changer machine of claim 4, wherein the at least one reference input is automatically determined by the controller.

6. The tire changer machine of claim 4, wherein the machine includes at least one machine vision component, the machine vision component determining the at least one reference input.

7. The tire changer machine of claim 4, wherein the machine includes a reference point locator, the reference point locator determining a location of the reference input when the at least one designated feature is aligned with the reference point locator.

8. The tire changer machine of claim 7, wherein the reference point locator is one of a laser indicator or a dataset arm.

9. The tire changer machine of claim 1, wherein the tire change procedure is one of a bead breaking procedure, a tire mounting procedure, and a tire de-mounting procedure.

10. The tire changer machine of claim 1, wherein the controller is further configured to, while the wheel rim and tire are rotated about the rotational axis in the tire change procedure, adjust operation of the drive assembly as the at least one designated feature is rotated proximate the at least one tool.

11. The tire changer machine of claim 10, wherein the controller is configured to adjust the operation of the drive assembly to stop or reverse the operation of the drive assembly.

12. The tire changer machine of claim 1, wherein the controller is further configured to alert an operator of a positional conflict between the at least one tool and the at least one designated feature while the tire change procedure is being executed.

13. The tire changer machine of claim 12, wherein the machine includes a display, and wherein the controller is further configured to display a message to an operator relating to the positional conflict.

14. The tire changer machine of claim 1, wherein the at least one tool is automatically positionable by the controller to engage the tire, and wherein the controller is further configured to initially adjust a relative position between the at least one designated feature and the at least one tool so as to perform the tire change procedure with a reduced likelihood of a positional conflict there between.

15. The tire changer machine of claim 1, wherein the tire change procedure is one of a tire mount procedure and a tire de-mount procedure.

16. The tire changer machine of claim 15, wherein an initial rotational position of the at least one designated feature with respect to the at least one tool is different prior to executing the respective tire mount and de-mount procedures.

17. The tire changer machine of claim 1, wherein the controller is further adapted to apply, based on the signal, at least one of a keep out zone or a keep in zone for one of the operation of one of the at least one tool and a rotational position of the at least one designated feature.

18. A tire changer machine for changing a tire on a wheel rim, the machine comprising:
a base;
a drive assembly coupled to the base and configured to rotate the wheel rim and tire about a drive axis;
at least one tool configured to engage the tire in a tire change procedure;
a rotational position sensor providing a signal indicative of a rotational position;
a controller responsive to said signal to monitor a rotational position of at least one designated feature of the wheel rim or tire during a tire change procedure; and
at least one force sensor associated with the at least one tool;
wherein the controller is configured to:
engage the at least one tool to the tire;
rotate the drive assembly;
receive a signal from the rotational position sensor; and
determine at least one reference point corresponding to a sensitive feature associated with the wheel rim or tire in response to the received force signal from the force sensor.

19. The tire changer machine of claim 18, wherein the at least one tool is a bead breaker tool.

20. A method of performing a tire change procedure utilizing a tire changer machine including a base, a drive assembly coupled to the base and configured to rotate a wheel rim and associated tire about a rotational axis, at least one tool configured to engage the tire in the tire change procedure, a rotational position sensor providing a signal indicative of a rotational position of the wheel rim and associated tire about the rotational axis, and a controller responsive to said signal, the method being executable by the controller and comprising:
accepting a reference input corresponding to a designated feature associated with the wheel rim or tire; and
operating the machine to avoid a positional conflict between the designated feature and the at least one tool by
adjusting a position of the at least one tool in response to the signal as the at least one designated feature is rotated proximate the tool during rotation of the wheel rim and tire about the rotational axis.

21. The method of claim 20, wherein the designated feature is one of a tire pressure monitoring system (TPMS) sensor and a valve stem.

22. The method of claim 20, the machine including a machine vision component, and wherein accepting the reference input comprises utilizing the machine vision component to determine the reference input.

23. The method of claim 20, further comprising:
using the reference input to determine the positional conflict.

24. The method of claim 20, wherein accepting the reference input comprises automatically determining, with the controller, the reference input.

25. The method of claim 20, the machine including a reference point locator, and wherein accepting the reference input comprises accepting a location designated by the reference point locator on the wheel rim or tire.

26. The method of claim 25, wherein the location designated by the reference point locator is aligned with the designated feature.

27. The method of claim 25, wherein the reference point locator is a laser indicator, and wherein accepting the reference input comprises accepting the location of a reference indicia illuminated with the laser indicator on the wheel rim or tire.

28. The method of claim 25, wherein the reference point locator is a dataset arm having an indicator tip, and wherein accepting the reference input comprise accepting the location of the dataset arm indicator tip.

29. The method of claim 20, wherein the at least one tool is a bead breaker tool.

30. The method of claim 20, wherein the tire change procedure is one of a bead breaking procedure, a tire mounting procedure, and a tire de-mounting procedure.

31. The method of claim 20, wherein operating the machine to avoid the positional conflict further comprises, while the wheel rim and tire are being rotated about the rotational axis in the tire change procedure, adjusting operation of the drive assembly as the at least one designated feature is rotated proximate the tool.

32. The method of claim 31, further comprising stopping or reversing the operation of the drive assembly to avoid the positional conflict.

33. The method of claim 20, further comprising alerting an operator of the positional conflict.

34. The method of claim 20, wherein the machine includes a display, the method further comprising displaying a message to an operator.

35. The method of claim 20, further comprising initially adjusting a relative position of the at least one designated feature and the at least one tool to perform a tire change procedure with a reduced likelihood of the positional conflict.

36. The method of claim 20, the method further comprising accepting one of a tire mount mode and a tire de-mount mode for executing the procedure.

37. The method of claim 36, further comprising rotating the tire to one of two different start positions respectively corresponding to the accepted one of the tire mount mode and the tire de-mount mode.

38. The method of claim 20, wherein accepting the reference input comprises recalling the reference input from a database or data store.

39. The method of claim 20, wherein operating the machine to avoid the positional conflict further comprises, while the wheel rim and tire are rotated about the rotational axis during the tire change procedure, applying at least one of a keep out zone and a keep in zone for one of the at least one tool and a rotational position of the designated feature.

40. A method of performing a tire change procedure with a tire changer machine including a base, a drive assembly coupled to the base and configured to rotate a wheel rim and associated tire about a rotational axis, at least one tool configured to engage the tire in a tire change procedure, a rotational position sensor providing a signal indicative of a rotational position of the wheel rim and associated tire, a controller responsive to said signal, and at least one force sensor associated with the at least one tool, the method being executable by the controller and comprising:
accepting a reference input corresponding to a designated feature associated with the wheel rim or tire by:
engaging the at least one tool to the tire;
rotating the wheel rim and tire about the rotational axis while monitoring the signal of the rotational position sensor; and
monitoring a force signal from the at least one force sensor to determine the at least one reference input, the reference input corresponding to the designated feature; and operating the machine to avoid a positional conflict between the designated feature and one of a component of the machine and the tire as influenced by the machine.

41. A tire changer machine for changing a tire on a wheel rim, the machine comprising:
- a base;
- a drive assembly coupled to the base and configured to rotate the wheel rim and tire about a rotational axis;
- at least one tool configured to engage the tire during a tire change procedure;
- a rotational position sensor configured to provide a signal indicative of a rotational position of the wheel rim and tire; and
- a controller operatively coupled to the drive assembly and to the at least one tool;
- wherein the controller is configured to:
  - monitor the signal and a rotational position of at least one designated feature of the wheel rim or tire during a tire change procedure; and
  - while the wheel rim and tire are rotated about the rotational axis during the tire change procedure, adjust a relative position between the at least one tool and the wheel rim or tire in response to the rotational position of the at least one designated feature, thereby avoiding a positional conflict between the at least one tool and the at least one designated feature.

42. The tire changer machine of claim 41 wherein the controller is configured to adjust the relative position between the at least one tool and the wheel rim or tire by adjusting the operation of the drive assembly.

43. The tire changer machine of claim 41 wherein the controller is configured to adjust the relative position between the tool and the wheel rim or tire by adjusting the position of the at least one tool.

44. A method of performing a tire change procedure utilizing a tire changer machine including a base, a drive assembly coupled to the base and configured to rotate a wheel rim and associated tire about a rotational axis, at least one tool configured to engage the tire in the tire change procedure, a rotational position sensor providing a signal indicative of a rotational position of the wheel rim and associated tire about the rotational axis, and a controller responsive to said signal, the method being executable by the controller and comprising:
- accepting a reference input corresponding to a rotational position of a designated feature associated with the wheel rim or tire; and
- operating the machine to avoid a positional conflict between the designated feature and the at least one tool during rotation of the wheel rim and associated tire about the rotational axis;
- wherein operating the machine to avoid the positional conflict comprises, while the wheel rim and tire are being rotated about the rotational axis, adjusting a relative position between the at least one tool and the wheel rim or tire in response to the rotational position signal.

45. The method of claim 44 wherein operating the machine to avoid the positional conflict further comprises adjusting the relative position between the at least one tool and the wheel rim or tire by adjusting the operation of the drive assembly.

46. The method of claim 44 wherein operating the machine to avoid the positional conflict further comprises adjusting the relative position between the tool and the wheel rim or tire by adjusting the position of the at least one tool.

* * * * *